(12) United States Patent
Kitamura

(10) Patent No.: US 9,221,517 B2
(45) Date of Patent: Dec. 29, 2015

(54) BICYCLE REAR HUB

(75) Inventor: Satoshi Kitamura, Osaka (JP)

(73) Assignee: Shimano Inc., Osaka (JP)

( * ) Notice: Subject to any disclaimer, the term of this patent is extended or adjusted under 35 U.S.C. 154(b) by 658 days.

(21) Appl. No.: 13/587,870

(22) Filed: Aug. 16, 2012

(65) Prior Publication Data

US 2013/0049445 A1 Feb. 28, 2013

(30) Foreign Application Priority Data

Aug. 29, 2011 (JP) ................................. 2011-186589
Apr. 9, 2012 (JP) ................................. 2012-088083

(51) Int. Cl.
*B60B 27/02* (2006.01)
*B62M 9/10* (2006.01)
*B60B 27/00* (2006.01)

(52) U.S. Cl.
CPC .............. *B62M 9/10* (2013.01); *B60B 27/0068* (2013.01); *B60B 27/023* (2013.01); *B60B 2900/113* (2013.01); *B62K 2207/00* (2013.01)

(58) Field of Classification Search
CPC .... B60B 27/04; B60B 27/0068; B60B 27/02; B60B 27/023
USPC .......................... 301/110.5; 73/514, 39, 2.298
See application file for complete search history.

(56) References Cited

U.S. PATENT DOCUMENTS

| | | | |
|---|---|---|---|
| 3,599,482 A * | 8/1971 | Rundell | 73/862.326 |
| 4,966,380 A * | 10/1990 | Mercat | 280/259 |
| 5,031,455 A | 7/1991 | Cline | |
| 5,065,633 A * | 11/1991 | Mercat | 73/862.326 |
| 6,418,797 B1 | 7/2002 | Ambrosina et al. | |
| 7,042,123 B2 | 5/2006 | Kitamura et al. | |
| 7,199,500 B2 * | 4/2007 | Yoshida | 310/257 |
| 8,091,674 B1 * | 1/2012 | Zhang et al. | 180/220 |
| 8,278,789 B2 * | 10/2012 | Nakano | 310/67 A |
| 8,336,400 B2 * | 12/2012 | Lassanske | 73/862.29 |
| 8,677,837 B2 * | 3/2014 | Mercat et al. | 73/862.338 |
| 2011/0120232 A1 | 5/2011 | Lassanske | |
| 2011/0174110 A1 * | 7/2011 | Benkert et al. | 74/594.2 |

FOREIGN PATENT DOCUMENTS

| | | |
|---|---|---|
| AT | 002268 U1 | 7/1998 |
| DE | 4431029 A1 * | 3/1996 |
| DE | 10 2007 046 749 A1 | 11/2008 |
| DE | 10 2009 043 949 A1 | 3/2010 |
| EP | 0343022 A1 | 11/1989 |
| EP | 1545076 A2 * | 6/2005 |

(Continued)

*Primary Examiner* — S. Joseph Morano
*Assistant Examiner* — Jean Charleston
(74) *Attorney, Agent, or Firm* — Global IP Counselors

(57) ABSTRACT

A bicycle rear hub includes a hub spindle, a drive part, a hub shell, at least one first opposed part, at least one second opposed part and a driving force measuring part. The drive part is rotatably supported on the hub spindle, and configured to receive a driving-force-input member. The hub shell is rotatably supported on the hub spindle and operatively coupled to the drive part for rotation by the drive part on the hub spindle. The at least one first opposed part is coupled to the drive part. The at least one second opposed part is coupled to the hub shell and being disposed oppose to the first opposed part with a gap therebetween. The driving force measuring part includes at least one sensor arranged to measure at least one of the gap between the first and second opposed parts and a displacement of the gap.

26 Claims, 16 Drawing Sheets

(56) References Cited

FOREIGN PATENT DOCUMENTS

| | | | |
|---|---|---|---|
| JP | 2009-192385 | A | 8/2009 |
| JP | 4744168 | B2 | 5/2011 |
| JP | 4764281 | B2 | 6/2011 |
| TW | 200841001 | A | 10/2008 |
| WO | 2011/066075 | A1 | 6/2011 |

* cited by examiner

BICYCLE REAR HUB

CROSS-REFERENCE TO RELATED APPLICATIONS

This application claims priority under 35 U.S.C. §119 to Japanese Patent Application No. 2011-186589, filed Aug. 29, 2011 and Japanese Patent Application No. 2012-088083, filed Apr. 9, 2012. The entire disclosures of Japanese Patent Application Nos. 2011-186589 and 2012-088083 are hereby incorporated herein by reference.

BACKGROUND

1. Field of the Invention

This invention generally relates to a bicycle hub. More specifically, the present invention relates to a rear bicycle hub constituting the hub for a rear wheel of a bicycle.

2. Background Information

A rear hub for a bicycle is provided with a hub spindle disposed at the center of rotation of the rear wheel; a hub shell installed rotatably about the hub spindle; and a freewheel disposed adjacently to the hub shell in the axial direction. Rotation of a sprocket, which is engaged with a chain, is delivered to the hub shell by the freewheel. There is known in the prior art a rear hub for a bicycle in which a driving force measuring part capable of measuring driving force of a rider is disposed between the freewheel and the hub shell (see U.S. Pat. No. 6,418,797, for example).

The prior art rear hub for a bicycle has a coupling member for coupling the freewheel and the hub shell. The coupling member is formed to a hollow cylindrical shape, and the sprocket is installed on one end part thereof, while the other end part is coupled to the hub shell. The coupling member is disposed with a strain gauge for detecting twisting of a coupling part thereof, and detects the amount of twist of the coupling part. Driving force of a rider is measured from the amount of twist measured thereby.

SUMMARY

In the rear hub of the prior art, the strain gauge is affixed directly to the coupling part, and because it is necessary, for example, for the adhesive used for adhesion purposes to be made uniform, accuracy of assembly is difficult.

It is an object of the present invention to make possible more accurate measurement of driving force, and to facilitate assembly of the driving force measuring part.

In accordance with a first aspect of the invention, a bicycle rear hub is provided that basically comprises a hub spindle, a drive part, a hub shell, at least one first opposed part, at least one second opposed part and a driving force measuring part. The drive part is rotatably supported on the hub spindle, and configured to receive a driving-force-input member. The hub shell is rotatably supported on the hub spindle and operatively coupled to the drive part for rotation by the drive part on the hub spindle. The at least one first opposed part is coupled to the drive part. The at least one second opposed part is coupled to the hub shell and being disposed oppose to the first opposed part with a gap therebetween. The driving force measuring part includes at least one sensor arranged to measure at least one of the gap between the first and second opposed parts and a displacement of the gap.

In the bicycle rear hub, when rotation of the drive part is transferred to the hub shell, the gap between the first opposed part which is provided in the drive part and the second opposed part which is provided in the hub shell changes according to the driving force (torque) which is transferred. It is possible to detect the gap between the first opposed part and the second opposed part or the change in the gap between the first opposed part and the second opposed part using the sensor. Here, since the relative gap between the first opposed part and the second opposed part or the displacement of the gap is detected using the sensor, it is possible to suppress the effect on the measurement result due to the attachment of the sensor and it is possible to facilitate assembly of the driving force measuring part.

In a bicycle rear hub according to a second aspect, the first opposed part and the second opposed part are opposed in a rotation direction of the drive part and the hub shell in the bicycle rear hub as described in the first aspect of the invention. Due to this, the first opposed part becomes close to the second opposed part according to the driving force by the drive part being twisted with respect to the hub shell when the driving force is transferred to the hub shell from the drive part. As a result, it is possible to accurately detect the driving force.

In a bicycle rear hub according to a third aspect, the first opposed part protrudes from an outer circumferential section of the drive part in the bicycle rear hub as described in the first aspect of the invention or the second aspect of the invention. In this case, since the first opposed part is dose to the hub shell, it is easy for the first opposed part to oppose the second opposed part which is provided in the hub shell.

In a bicycle rear hub according to a fourth aspect of the invention, the second opposed part protrudes from an inner circumferential section of the hub wheel in the bicycle rear hub as described in any of the first to third aspects of the inventions. In this case, since the second opposed part is close to the drive part, it is easy for the first opposed part to oppose the second opposed part.

In a bicycle rear hub according to a fifth aspect of the invention, the drive part has a coupling member which is coupled to the hub shell in the bicycle rear hub as described in any of the first to fourth aspects of the inventions.

In a bicycle rear hub according to a sixth aspect of the invention, the coupling member is provided to be integrated with the first opposed part in the bicycle rear hub as described in the fifth aspect of the invention. In this case, since the coupling member is provided to be integrated with the first opposed part, the configuration of the drive part is simple.

In a bicycle rear hub according to a seventh aspect of the invention, the coupling member is provided to be separate to the first opposed part in the bicycle rear hub as described in the fifth aspect of the invention. In this case, the degree of freedom in regard to the shape of the coupling member is high and it is easy to arbitrarily set the rigidity of the coupling member. For example, due to the rigidity of the coupling member being lower than the other portions of the drive part, it is possible for the displacement of the gap between the first opposed part and the second opposed part to be larger. Due to this, it is possible to improve the output of the sensor with respect to the driving force.

In a bicycle rear hub according to an eighth aspect of the invention, the coupling member is formed in a ring shape and a plurality of through holes which extend in a hub spindle direction are formed in the bicycle rear hub as described in the seventh aspect of the invention. In this case, due to the shape of the through holes, it is possible to arbitrarily set the rigidity of the coupling member.

In a bicycle rear hub according to a ninth aspect of the invention, the coupling member and the hub shell are joined using serration or adhesion in the bicycle rear hub as described in any of the fifth to eighth aspects of the inventions. In this case, the linking configuration of the hub shell and the coupling member is simple.

In a bicycle rear hub according to a tenth aspect of the invention, the coupling member and the hub shell are coupled at a central section of the hub shell in the hub spindle direction in the bicycle rear hub as described in any of the fifth to ninth aspects of the inventions. In this case, since the length of the coupling member in the axis direction of the hub spindle is longer, it is easy for the coupling member to twist and it is possible for twisting to the left and right in the hub shell to be suppressed.

In a bicycle rear hub according to an eleventh aspect of the invention, a plurality of units of the first opposed part and the second opposed part are provided in the bicycle rear hub as described in any of the first to tenth aspects of the inventions. Due to this, since it is possible to detect the gap between the first opposed part and the second opposed part or the displacement of the gap at a plurality of locations, detection accuracy is improved.

In a bicycle rear hub according to a twelfth aspect of the invention, the at least one sensor includes a plurality of the sensors are provided in the at least one sensor includes a plurality of the sensors in at least one of the plurality of the first and second units of the first and second opposed parts as described in the eleventh aspect of the invention. In this case, it is possible to provide the sensor in any one of the first opposed part and the second opposed part or both according to the type of the sensor.

In a bicycle rear hub according to a thirteenth aspect of the invention, the sensors are provided in the first opposed part in the bicycle rear hub as described in the twelfth aspect of the invention.

In a bicycle rear hub according to an invention 14, the sensors are provided in the second opposed part in the bicycle rear hub as described in the twelfth aspect of the invention.

In a bicycle rear hub according to a fifteenth aspect of the invention, the sensor is provided in the first opposed part of at least any one unit and the sensor is provided in the second opposed part of at least any one unit out of the plurality of units of the first opposed pail and the second opposed part in the bicycle rear hub as described in the twelfth aspect of the invention.

In a bicycle rear hub according to a sixteenth aspect of the invention, the sensors are eddy current type sensors in the bicycle rear hub as described in any of the eleventh to fifteenth aspects of the inventions. In this case, it is possible to measure the gap or the displacement of the gap using a high-frequency magnetic field.

In a bicycle rear hub according to a seventeenth aspect of the invention, the sensors are electrostatic capacity type sensors in the bicycle rear hub as described in any of the eleventh to fifteenth aspects of the inventions. In this case, it is possible to detect the gap or the displacement of the gap using displacement in electrostatic capacity by provided a condenser in the first opposed part and the second opposed part.

In a bicycle rear hub according to an eighteenth aspect of the invention, the sensor of an electrostatic capacity type has a condenser in the bicycle rear hub as described in the seventeenth aspect of the invention.

In a bicycle rear hub according to a nineteenth aspect of the invention the sensors are optical type sensors in the bicycle rear hub as described in any of the eleventh to fifteenth aspects of the inventions. In this case, it is possible to detect the gap or the displacement of the gap using the irradiation of light such as laser light and a phase difference in the reflected light.

In a bicycle rear hub according to a twentieth aspect of the invention, the sensors have a coil in the bicycle rear hub as described in any of the eleventh to fifteenth aspects of the inventions. In this case, it is possible to detect the gap or the displacement of the gap using a change in the impedance of the coil due to an electromagnetic induction action.

In a bicycle rear hub according to a twenty-first aspect of the invention, the sensors are connected in series in the bicycle rear hub as described in any of the eleventh to fifteenth aspects of the inventions. In this case, it is possible to simplify the configuration since it is not necessary to individually provide signal processing circuits which detect the signals from the plurality of sensors and it is possible to reduce the consumption of current. In addition, it is possible to accurately detect the gap or the displacement of the gap since errors in the outputs of the plurality of sensors which are arranged in different positions are offset.

In a bicycle rear hub according to a twenty-second aspect of the invention, the sensors are connected in parallel in the bicycle rear hub as described in any of the eleventh to twentieth aspects of the inventions. In this case, it is possible to simplify the configuration since it is not necessary to individually provide signal processing circuits which detect the signals from the plurality of sensors and it is possible to reduce the consumption of current. In addition, it is possible to accurately detect the gap or the displacement of the gap since the outputs of the plurality of sensors which are arranged in different positions are offset.

In a bicycle rear hub according a twenty-third aspect of the invention, a wireless transmission section which transmits information based on the output of the sensor to an external section in a wireless manner is further provided in the bicycle rear hub as described in any of the eleventh to twenty-second aspects of the inventions. For example, it is easy to take out the output to an external section even if the sensor is rotating along with the hub shell.

In a bicycle rear hub according to a twenty-fourth aspect of the invention, a power source which supplies power to the sensor is further provided in the bicycle rear hub as described in any of the first to twenty-third aspects of the inventions.

In a bicycle rear hub according to a twenty-fifth aspect of the invention aspect of the invention, the power source is a battery in the bicycle rear hub as described in the twenty-fourth aspect of the invention.

In a bicycle rear hub according to a twenty-sixth aspect of the invention, the power source is a power generator in the bicycle rear hub as described in the twenty-fourth aspect of the invention. In this case, since power is generated as the bicycle is ridden, charging or replacement of a battery is not necessary.

A bicycle rear hub according to a twenty-seventh aspect of the invention is provided with a hub spindle, a drive part, a hub shell, and a driving force measuring part. The drive part is supported by the hub spindle so as to rotate freely and a driving-force-input member is able to be attached. The hub shell is supported by the hub spindle so as to rotate freely and transfers rotation of the drive part. The driving force measuring part is able to measure driving force which is transferred to the hub shell from the drive part. The drive part has an outer side cylindrical section where the driving-force-input member is mounted, an inner side cylindrical section which is arranged at an inner side of the outer side cylindrical section, and a target measurement section which is integrally formed with the inner side cylindrical section.

In the bicycle rear hub, the target measurement section which is provided in the drive part is twisted according to the driving force (torque) which is transferred when rotation of the drive part is transferred to the hub shell. It is possible to measure the change in shape using the driving force measuring part. Due to the inner side cylindrical section and the target measurement section being configured to be integrated, noise which is measured by the driving force measuring part is reduced, it is possible to improve the measurement accuracy since it is difficult for deviation in the twisting of the target measurement section to occur, and it is possible to lighten the weight compared to a case where the inner side cylindrical section and the target measurement section are configured to be separate.

In a bicycle rear hub according to a twenty-eighth aspect of the invention, the inner side cylindrical section and the outer side cylindrical section are configured as a one-way clutch in the bicycle rear hub as described in the twenty-seventh aspect of the invention. In this case, only rotation in one direction of the outer side cylindrical section (for example, rotation in the travelling direction of the bicycle) is transferred to the inner side cylindrical section.

In a bicycle rear hub according to a twenty-ninth aspect of the invention, the drive part has a further coupling member which is coupled to the hub shell in the bicycle rear hub as described in the twenty-seventh aspect of the invention or the twenty-eighth aspect of the invention. The coupling member is coupled to the inner side of the hub shell. In this case, it is possible to link the drive part and the hub shell without any relation to the outside shape of the rear hub and a degree of freedom in the design of the outer shape of the rear hub is maintained.

In a bicycle rear hub according to a thirtieth aspect of the invention, the coupling member is coupled to a middle portion of the hub shell in the axis direction in the bicycle rear hub as described in the twenty-ninth aspect of the invention. In this case, since the coupling member is coupled to a middle portion of the hub shell in the axis direction, it is possible to suppress an increase in the weight of the rear hub.

In a bicycle rear hub according to a thirty-first aspect of the invention, the target measurement section is provided between the coupling member and the inner side cylindrical section in the bicycle rear hub as described in the twenty-ninth aspect of the invention or the thirtieth aspect of the invention. In this case, since the target measurement section is provided between the coupling member and the inner side cylindrical section, it is easy for the target measurement section to change shape.

In a bicycle rear hub according to a thirty-second aspect of the invention, the driving force measuring part is arranged at an inner side of the hub shell in the bicycle rear hub as described in any of the twenty-ninth to the thirty-first aspects of the inventions.

In a bicycle rear hub according to a thirty-third aspect of the invention, the coupling member is fixed by being screwed to the hub shell in the bicycle rear hub as described in any of the twenty-ninth to the thirty-second aspects of the inventions.

In a bicycle rear hub according to a thirty-fourth aspect of the invention, the driving force measuring part has at least one strain gauge in the bicycle rear hub as described in any of the twenty-ninth to the thirty-third aspects of the inventions. In this case, since the change in shape of the target measurement section is measured using the strain gauge, it is possible to accurately detect the driving force even with slight screwing.

In a bicycle rear hub according to a thirty-fifth aspect of the invention, the driving force measuring part has a magnetostrictor which is arranged at an outer circumferential surface of the target measurement section and a detection coil which is arranged at an inner circumference surface of the hub shell to oppose the magnetostrictor in the bicycle rear hub as described in any of the twenty-ninth to the thirty-third aspect of the invention. In this case, it is possible to further accurately measure the driving force even with a slight twist since it is possible for the driving force to be detected using the magnetostrictor.

With the bicycle rear hub of this present disclosure, since it is possible for the driving force to be detected using the gap between the first opposed part and the second opposed part or a change in the gap, it is possible to suppress the effect on the measurement results due to the attachment of the sensor and it is possible to facilitate assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
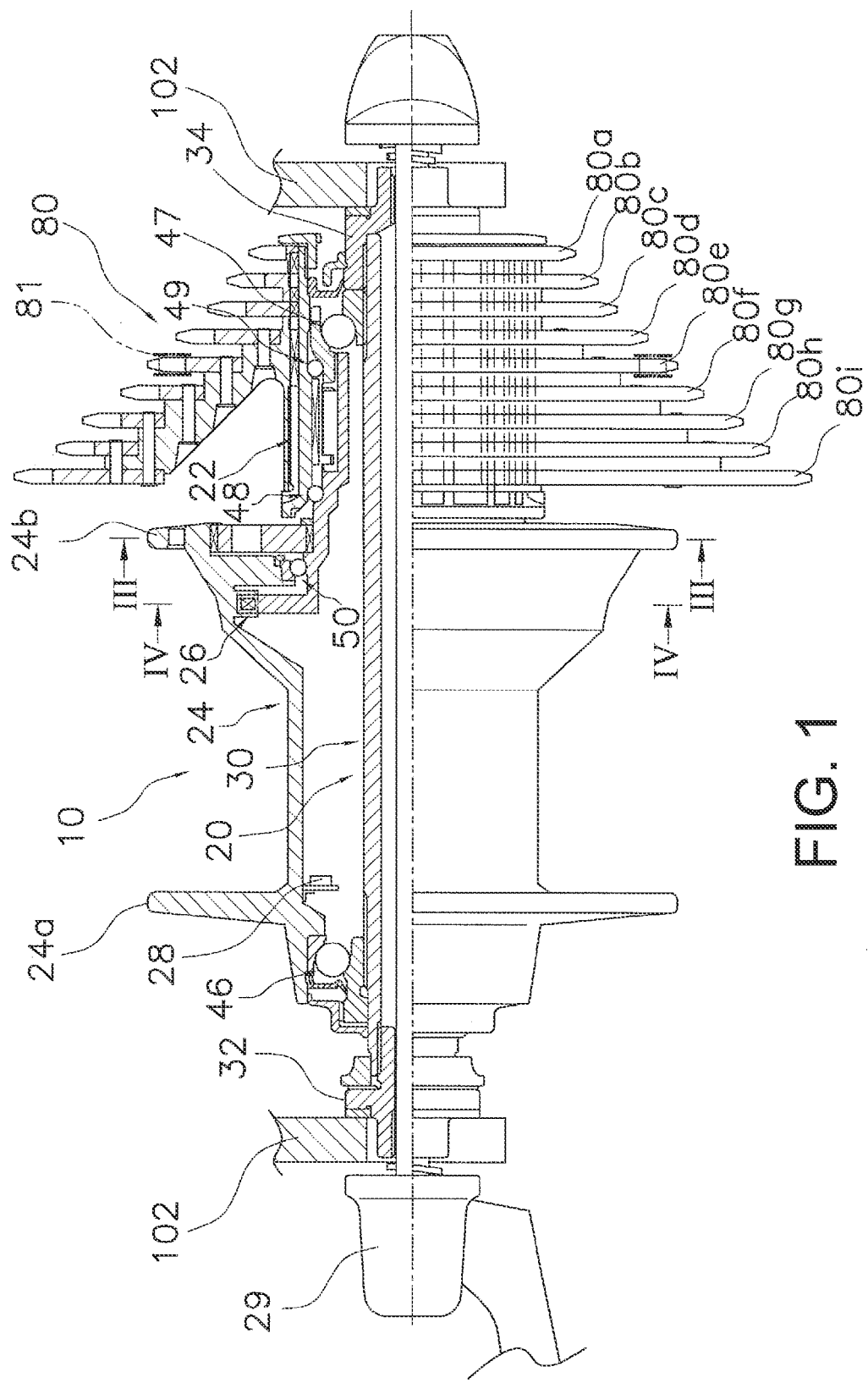
FIG. 1 is half cross sectional view of a bicycle rear hub according to an embodiment.

Referring initially to FIG. 1, a bicycle rear hub 10 is illustrated in accordance with a first embodiment. As shown in FIG. 1, the rear hub 10 is able to be mounted onto a hub spindle mounting section 102 which is installable at a rear section of a frame of a bicycle. The rear hub 10 is provided with a hub spindle 20, a drive part 22, a hub shell 24, a driving force measuring part 26, and a wireless transmitter 28. The hub shell 24 is supported in the hub spindle 20 so as to rotate freely using a first bearing 46. The drive part 22 is supported in the hub spindle 20 so as to rotate freely using a second bearing 47. The driving force measuring part 26 is able to measure the driving force of a rider. The wireless transmitter 28 wirelessly transmits information related to the driving force which is measured. The information related to the driving force which is wirelessly transmitted is displayed on, for example, a cycle computer (not shown) which is able to be mounted on a handlebar of the bicycle. Here, in the cycle computer, information such as the speed of the bicycle, the rotation speed of a crank (cadence), the distance travelled, and the like is also displayed.

The hub spindle 20 has a hollow spindle body 30 where a quick release mechanism 29 is mounted, a first lock nut 32 which is mounted to a first end (the end on the left side of FIG. 2) of the spindle body 30, and a second lock nut 34 which is mounted to a second end (the end on the right side of FIG. 2) of the spindle body 30. The hub spindle mounting section 102 is able to be mounted to the first lock nut 32 and the second lock nut 34. Here, a configuration where the first lock nut 32 and the second lock nut 34 are mounted to the mounting section 102 is as described, but there may be a configuration where the spindle body 30 is mounted to the hub spindle mounting section 102 on the frame.

Figure 2:
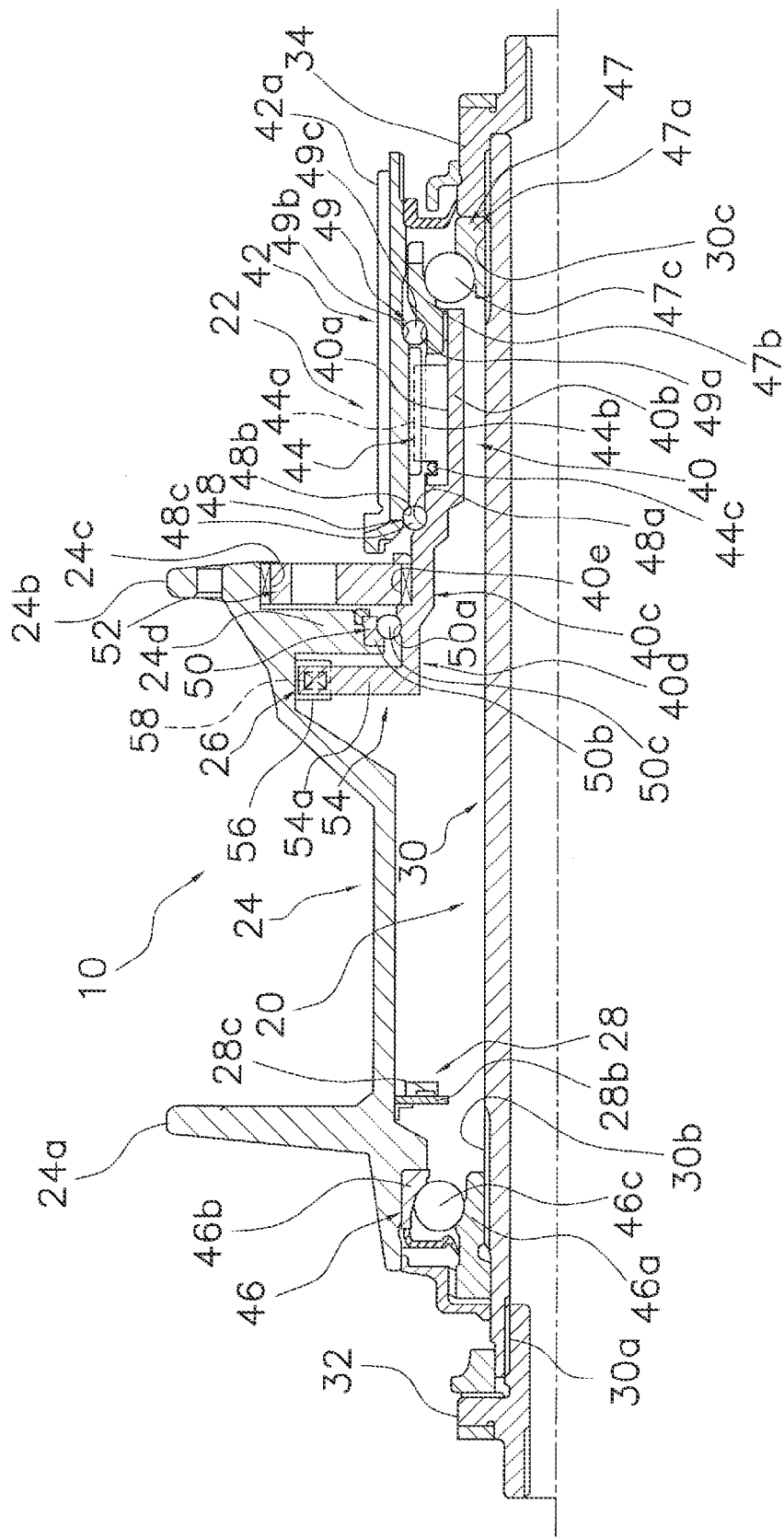
FIG. 2 is a cross-sectional view of a main portion of the bicycle rear hub in FIG. 1.

As shown in FIG. 2, a female screw section 30a is formed in an inner circumferential surface of the first edge of the spindle body 30. A first male screw section 30b and a second male screw section 30c are respectively formed in outer circumferential surfaces of the first and second ends of the spindle body 30. The first lock nut 32 has a male screw section which screws together with the female screw section 30a and is fixed by being screwed to the spindle body 30. The second lock nut 34 has a female screw section which screws together with the male screw section 30c and is fixed by being screwed to the spindle body 30.

The drive part 22 is configured to include a member which is referred to as a so-called freewheel. The drive part 22 has a first member 40 which is supported in the hub spindle 20 so as to rotate freely, a second member 42 which is arranged at an outer circumferential side of the first member 40, a one-way clutch 44 which is arranged between the first member 40 and the second member 42, and a coupling member 52.

The first member 40 is a cylindrical member which is supported in the hub spindle 20 so as to rotate freely using the second bearing 47. The second bearing 47 has a second inner ring body 47a, a second outer ring body 47b, and a plurality of second rolling elements 47c. The second inner ring body 47a has a screw formed in an outer circumferential section and is fixed by being screwed to the second male screw section 30c of the spindle body 30. The second outer ring body 47b has a screw formed in an inner circumferential section and is fixed by being screwed to a male screw section which is formed in an outer circumferential surface of the first member 40. The plurality of second rolling elements 47c are provided to be separated by a gap in the circumferential direction between the second inner ring body 47a and the second outer ring body 47b. The second rolling elements 47c are arranged to open a predetermined gap in the circumferential direction by being held on a retainer (not shown) so as to be able to rotate. The second rolling elements 47c may be spherical or may be rollers.

The first member 40 has a first cylinder section 40b which is provided with a concave section 40a where a clutch claw 44a of the one-way clutch 44 is accommodated. A first end (an end on the left side of FIG. 2) of the first member 40 extends until the inner circumferential side of the hub shell 24. The first member 40 has a second cylinder section 40c with a larger diameter than the first cylinder section 40b and a third cylinder section 40d with a larger diameter than the second cylinder section 40c in this order in the first end side (left side in FIG. 2) of the first cylinder section 40b. The second outer ring body 47b of the second bearing 47 is fixed to a second end (an end on the right side of FIG. 2) of the first cylinder section 40b. A third inner ring surface 48a which configures a third bearing 48 is formed in an outer circumferential section on a boundary portion of the first cylinder section 40b and the second cylinder section 40c. A first serration section 40e which is coupled to the coupling member 52 is formed in an outer circumferential surface of the second cylinder section 40c. A fifth inner ring surface 50a of a fifth bearing 50, which is for supporting the hub shell 24 so as to rotate freely on the drive part 22, is formed in an outer circumferential surface of the third cylinder section 40d.

The second member 42 is a cylindrical member which is supported so as to rotate freely with respect to the first member 40 using the third bearing 48 and the fourth bearing 49. The third bearing 48 is formed by a third inner ring surface 48a as described above, a third outer ring surface 48b, and a plurality of third rolling elements 48c. The third outer ring surface 48b is formed at an inner circumferential surface of a first end (an end on the left side of FIG. 2) of the second member 42. The plurality of third rolling elements 48c are provided to be separated by a gap in the circumferential direction between the third inner ring body 48a and the third outer ring body 48b. The third rolling elements 48c are arranged to open a predetermined gap in the circumferential direction by being held on a retainer (not shown) so as to be able to rotate. The third rolling elements 48c may be spherical or may be rollers.

The fourth bearing 49 is formed by a fourth inner ring surface 49a which is formed at an outer circumferential surface of the second outer ring body 47b, a fourth outer ring surface 49b, and a plurality of fourth rolling elements 49c. The fourth outer ring surface 49b is formed at an inner circumferential surface of a middle section of the second member 42 in the hub spindle direction. The plurality of fourth rolling elements 49c are provided to be separated by a gap in the circumferential direction between the fourth inner ring body 49a and the fourth outer ring body 49b. The fourth rolling elements 49c are arranged to open a predetermined gap in the circumferential direction by being held on a retainer (not shown) on as to be able to rotate. The fourth rolling elements 49c may be spherical or may be rollers.

As shown in FIG. 1, the second member 42 has a sprocket mounting section 42a where a sprocket assembly 80 is mounted at an outer circumferential surface. The sprocket assembly 80 rotates integrally with the second member 42. The sprocket assembly 80 is an example of a driving-force-input member. The sprocket mounting section 42a has, for example, a spline which has a convex section or a concave section arranged to be separated by a gap in the circumferential direction in an outer circumferential section. As shown in FIG. 1, the sprocket assembly 80 has a plurality of sprockets 80a to 80i (for example, nine) with a different number of teeth. The rotation of a crank (not shown) is transferred to the drive part 22 using a chain 81 which meshes with any of the sprockets in the sprocket assembly 80. Here, the plurality of sprockets are mounted in the sprocket mounting section 42a, but the number of sprockets which are mounted in the sprocket mounting section 42a may be one.

The one-way clutch 44 is provided in order to transfer only rotation of the second member 42 in the travelling direction of the bicycle to the first member 40. Due to this, only rotation in the travelling direction of the crank is transferred to the hub shell 24. In addition, the rotation in the travelling direction of the hub shell 24 is not transferred to the second member 24. The one-way clutch 44 has the clutch claw 44a which is provided so as to swing freely to a first positioning and a second positioning in the concave section 40a, a ratchet tooth 44b which is formed in the inner circumferential surface of the second member 42, and a pressing member 44c which presses the clutch claw 44a. The clutch claw 44a comes into contact with the ratchet tooth 44b at the first positioning and is separated from the ratchet tooth 44b at the second positioning. The pressing member 44c is mounted in a ring groove which is formed in the first member 40. The pressing member 44c is a spring member which is formed by a metal wire material being bent into a C shape and presses the clutch claw 44a to the first positioning side.

Figure 3:
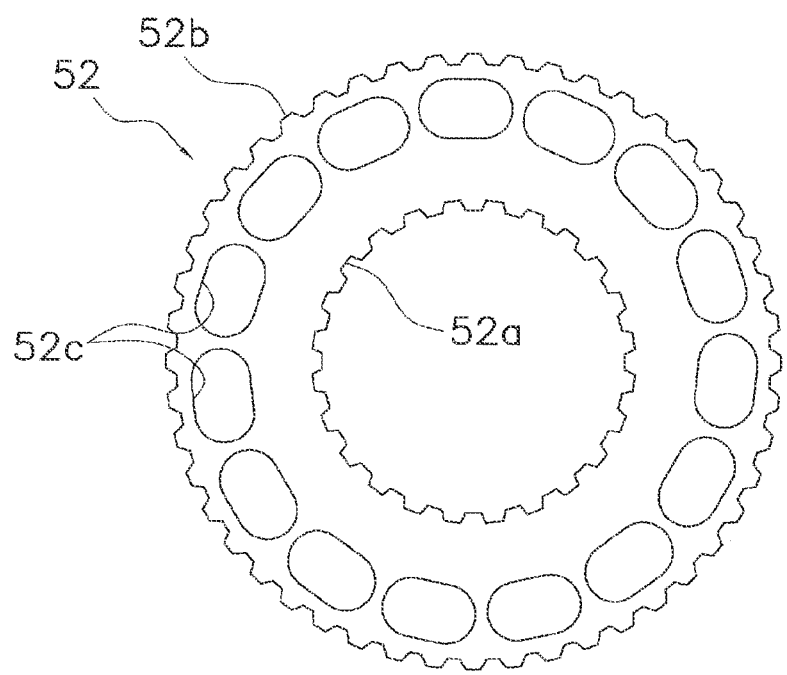
FIG. 3 is a cross-sectional view of the bicycle rear hub taken along section line III-III in FIG. 1.

The coupling member 52 is provided on a driving force transferring path which spans from the drive part 22 to the hub shell 24. In this embodiment, the coupling member 52 is provided between an inner circumferential section of the hub shell 24 and the first member 40 at a second end (an end at the right side of FIG. 2) of the hub shell 24. The coupling member 52 is provided more to the second end side of the hub shell 24 than a spindle reception supporting section 24d of the hub shell 24 which will be described later and is adjacent to the spindle reception supporting section 24d. As shown in FIG. 3, the coupling member 52 is a member with a circular ring shape and has a second serration section 52a which engages with the first serration section 40e of the first member 40 at an inner circumferential section. The coupling member 52 has a fourth serration section 52b which engages with a third serration section 24c of the hub shell 24 at an outer circumferential section. The coupling member 52 has a plurality of holes 52c which are formed to be separated with gaps in the circumferential direction. The holes 52c penetrate through the coupling member in the hub spindle direction. The holes 52c are formed as long holes and the longitudinal direction thereof is along the circumferential direction. The holes 52c are provided so that it is easy for the coupling member 52 to twist according to the driving force when the driving force (torque) is transferred from the drive part 22 to the hub shell 24 by the rigidity of the coupling member 52 being lowered due to the drive part 22 and the hub shell 24.

The hub shell 24 is a configuration which is able to be separated in the axis direction. As shown in FIG. 2, a first end (an end on the left side in FIG. 2) of the hub shell 24 is supported in the spindle body 30 of the hub spindle 20 so as to rotate freely using the first bearing 46. A second end (an end on the right side in FIG. 2) of the hub shell is supported in the spindle body 30 of the hub spindle 20 so as to rotate freely via the drive part 22 using the fifth bearing 50 as described above. The spindle reception supporting section 24d, which is mounted to a fifth outer ring body 50b of the fifth bearing 50, is provided in the second end of the hub shell 24. The spindle reception supporting section 24d protrudes to the hub spindle 20 side at the inner circumferential section of the hub shell 24.

The spindle reception supporting section 24d is formed in a ring shape. The first bearing 46 has a first inner ring body 46a which has a screw formed in an inner circumferential surface and is fixed by being screwed to the first male screw section 30b of the spindle body 30, a first outer ring body 46b, and a plurality of first rolling elements 46c. The first rolling elements 46c are arranged to open a predetermined gap in the circumferential direction by being held on a retainer (not shown) so as to be able to rotate. The first rolling elements 46c may be spherical or may be rollers.

The fifth bearing 50 has a fifth inner ring surface 50a as described above, a fifth outer ring surface 50b which is, for example, pressed and fixed to an inner circumferential section of the second end of the hub shell 24, and a plurality of fifth rolling elements 50c. The plurality of fifth rolling elements 50c are provided to be separated by a gap in the circumferential direction between the fifth inner ring body 50a and the fifth outer ring body 50b. The fifth rolling elements 50c are arranged to open a predetermined gap in the circumferential direction by being held on a retainer (not shown) on as to be able to rotate. The fifth rolling elements 50c may be spherical or may be rollers.

In an outer circumferential surface of the hub shell 24, a first hub flange 24a and a second hub flange 24b for linking to the spokes of the rear wheel of the bicycle are formed to protrude in a ring shape to be separated by a gap in the axis direction of the hub spindle 20. A second serration concave section 24c which engages with the outer circumferential surface of the coupling member 52 is formed in an inner circumferential surface of a first end (an end on the right side in FIG. 2) of the hat) shell 24. A partition section 24d with a ring shape for the mounting of the fifth bearing 50 is formed in a first side of the second serration concave section 24c.

The first opposed part 54 is provided in the first end of the first member 40 of the drive part 22. The first opposed part 54 is provided to protrude to the outside from an outer circumferential section of the first member 40, here, to protrude from an outer circumferential section of the third cylinder section 40d. The first opposed part 54 has an arm section 54a which extends toward an inner circumferential surface of the hub shell 24 from an outer circumferential section of the third cylinder section 40d. Here, it is sufficient if there is at least one of the first opposed parts 54. The first opposed part 54 is configured to be a separate body to the coupling member 52. The first opposed part 54 extends more to the outside in the radial direction than the fifth outer ring body 50b of the fifth bearing 50. The first opposed part 54 is formed integrally with the drive part 22.

Figure 4:
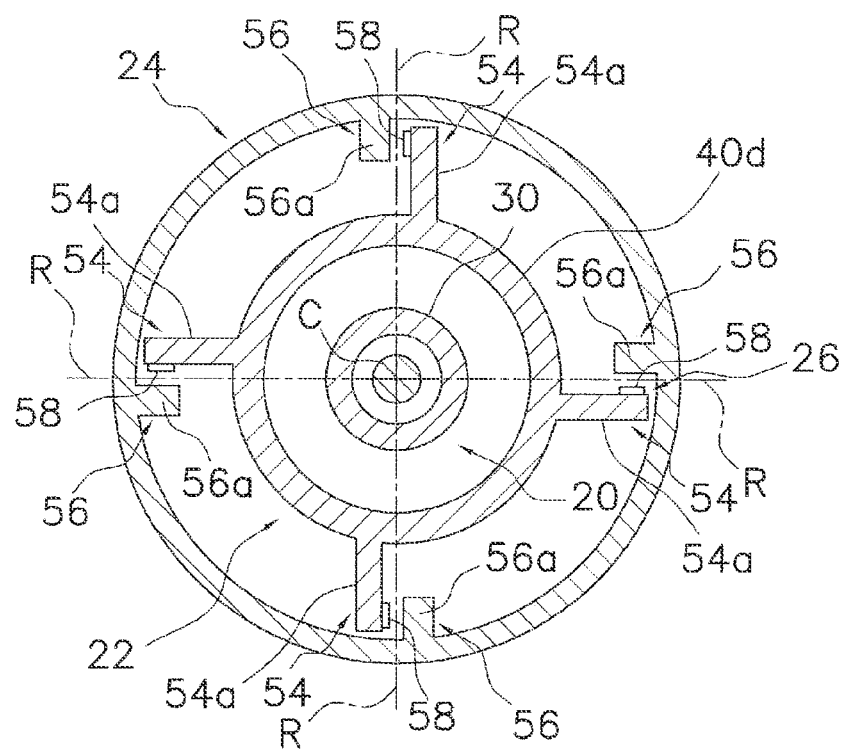
FIG. 4 is a cross-sectional view of the bicycle rear hub taken along section line IV-IV in FIG. 1.

The second opposed part 56 is provided to oppose the first opposed part 54 to open a gap with the first opposed part 54 in the rotation direction of the drive part 22 and the hub shell 24. The rotation direction of the drive part 22 and the hub shell 24 is a direction where there is rotation when the bicycle is travelling forward. The second opposed part 56 is provided at a downstream side in the rotation direction of the first opposed part 54. The second opposed part 56 is provided to be close to the spindle reception supporting section 24d of the hub shell 24 and is provided more to a first end side (an end on the left side in FIG. 2) of the hub shell 24 than the spindle reception supporting section 24d. The second opposed part 56 has a protruding section 56a which protrudes toward the drive part 22 from an inner circumferential section of the hub shell 24. It is preferable that opposing surfaces, where the arm section 54a of the first opposed part 54 and the protruding section 56a of the second opposed part 56 oppose each other in the rotation direction, be arranged to be parallel. As shown in FIG. 4, a plurality of the first opposed part 54 and the second opposed part 56 are arranged to be opposed to interpose a plurality of virtual radial lines R which extend in a radiating direction from a center axis line C of the hub spindle 20 on a plane which is orthogonal to the center axis line. In FIG. 4, a case is shown where there are four virtual radial lines and a case is shown where four of each of the first opposed part 54 and the second opposed part 56 are provided. The second opposed part 56 is provided in the same number as the first opposed part 54. It is preferable that the plurality of pairs of the first opposed part 54 and the second opposed part 56 be provided in positions which are rotationally symmetrical around the center axis line C of the hub spindle 20. In addition, it is preferable that the plurality of first opposed parts 54 be provided such that the distances to the adjacent first opposed part 54 be equal in the circumferential direction and that the plurality of second opposed part 56 be provided such that the distances to the adjacent second opposed part 56 be equal in the circumferential direction. The second opposed part 56 is formed integrally with the hub shell 24.

The driving force measuring part 26 has at least one sensor 58. The sensor 58 is able to measure the gap between the first opposed part 54 and the second opposed part 56 or displacement of the gap. The sensor 58 is, for example, an eddy current type of sensor. In this embodiment, the sensor 58 is provided in the first opposed part 54. More specifically, the sensor 58 is provided in a portion which opposes the second opposed part 56 at a tip end of the first opposed part 54.

The eddy current type of sensor 58 utilizes a high-frequency magnetic field. Specifically, a high-frequency magnetic field is generated by a high-frequency current flowing in a coil at the inner section of a sensor head. When the second opposed part 56 is in the magnetic field, an eddy current in a direction which is orthogonal to the passage of the magnetic flux flows in the surface of the second opposed part 56 due to an electromagnetic induction action and the impedance of the sensor coil changes according to the distance with the second opposed part 56. The eddy current type of sensor 58 utilizes this phenomenon and outputs a signal which represents the gap between the first opposed part 54 and the second opposed part 56 or a signal according to the displacement of the gap. Here, the sensors 58 are connected in series or in parallel.

The wireless transmitter 28 has a circuit substrate 28b which is fixed to an inner circumferential section of the hub shell 24. The sensor 58 and the circuit substrate 28b are electrically connected by a wire (not shown). In the circuit substrate 28b, electronic components such as a microcomputer, an amplifier which amplifies the output from the sensor 58, an AD (Analog-Digital) conversion circuit which converts the signal which is amplified by the amplifier into a digital signal, and a wireless transmission circuit, and a rechargeable battery 28c as a power source are mounted. In this embodiment, the microcomputer, the amplifier, and the AD conversion circuit are configured as a part of the driving force measuring part 26.

The wireless transmitter 28 wirelessly transmits information based on the output of the sensor 58. The information which is wirelessly transmitted from the wireless transmitter 28 is displayed as at least any of the driving force, the torque, or the power using a cycle computer (not shown). At least any of the driving force, the torque, or the power may be calculated in the microcomputer which is provided in the circuit substrate 28b based on the output of the sensor 58, and at least any of the driving force, the torque, or the power may be calculated in the cycle computer based on the information which is received. Instead of the rechargeable battery 28c, a primary battery may be provided. The rechargeable battery 28c or the primary battery is provided in the circuit substrate 28b to be freely attachable and detachable.

In the rear hub 10 which is configured in this manner, when attached to the bicycle and the rider pedals, tread force of the rider is transferred from the drive part 22 to the hub shell 24 as the driving force. At this time, the coupling member 52 is slightly twisted and the gap between the first opposed part 54 and the second opposed part 56 changes according to the driving force. Specifically, when the driving force is large, the amount of twisting of the coupling member 52 is large and the first opposed part 54 which is provided with the sensor 58 becomes closer to the second opposed part 56. The wireless transmitter 28 processes the information on the driving force according to the output of the sensor 58 and the wireless transmitter 28 wirelessly transmits to the cycle computer. The information which represents the driving force which has been wirelessly transmitted is received and displayed in the cycle computer. Due to this, it is possible for the rider to know the driving force, the torque, the power, and the like which is generated by the rider.

Here, since the relative gap between the first opposed part 54 and the second opposed part 56 or the displacement of the gap is detected using the sensor 58, it is possible to suppress the effect on the measurement result due to the attachment of the sensor 58 and it is possible to facilitate assembly.

In the first embodiment, the coupling member 52 is configured to be separate to the first member 40 of the drive part 22, but the present invention is not limited thereto. The coupling member may take any format as long as it is in the drive part in the driving force transferring path from the drive part to the hub shell. Here, in the description from here onward, the description of the members where the configuration and shape are the same as the first embodiment will be omitted.

Figure 5:
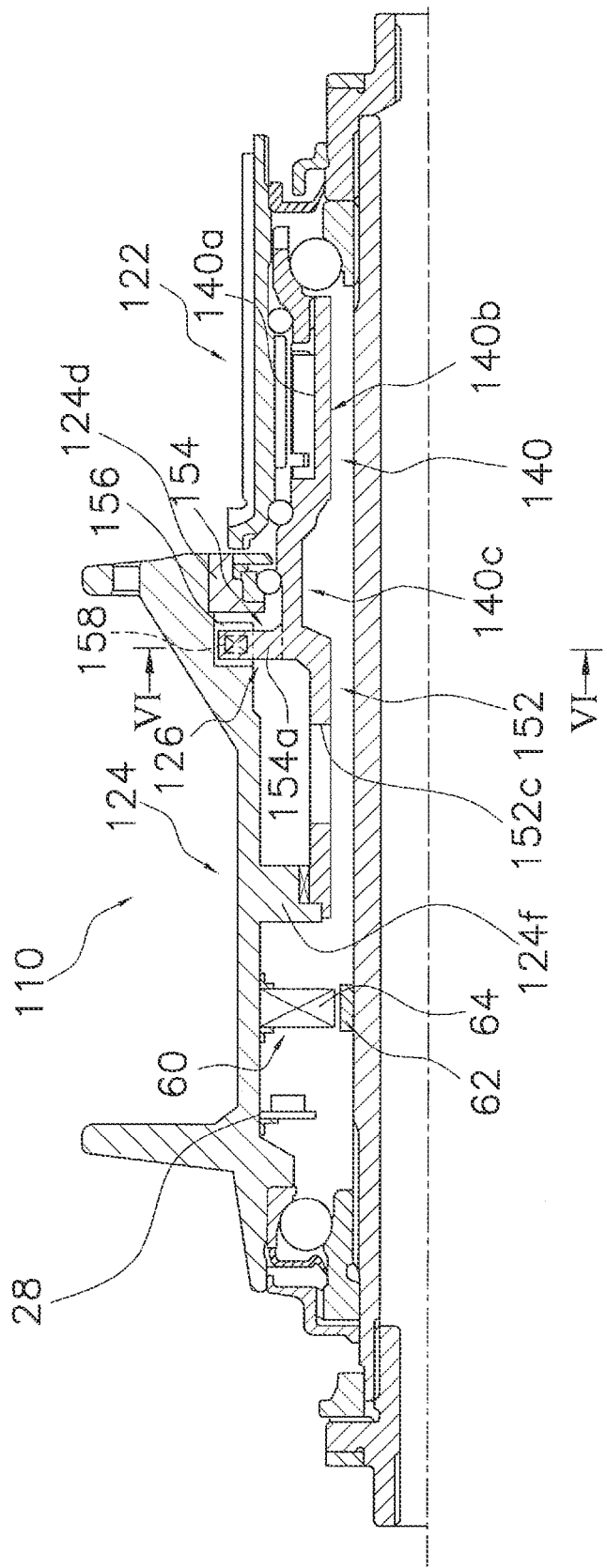
FIG. 5 is a cross-sectional view, corresponding to FIG. 2, of a main portion of a bicycle rear hub in accordance with a second embodiment.

As shown in FIG. 5, a rear hub 110 is provided with the hub spindle 20, a drive part 122, a hub shell 124, at least one first opposed part 154, at least one second opposed part 156, a driving force measuring part 126, a wireless transmission section 128, and a power generator 160.

The coupling member 152 of the drive part 122 is formed integrally with a first member 140 of the drive part 122. The first member 140 has a first cylinder section 140b which is provided with a concave section 140a. A first end (an end on the left side of FIG. 5) of the first member 140 extends until the inner circumferential side of the hub shell 124. The first member 140 has a second cylinder section 140c with a larger diameter than the first cylinder section 140b in the first end side (left side in FIG. 5) of the first cylinder section 140b. The coupling member 152 is a cylindrical portion which is formed in the second cylinder section 140c of the first member section 140 with a smaller diameter than the second cylinder section 140c.

Figure 6:
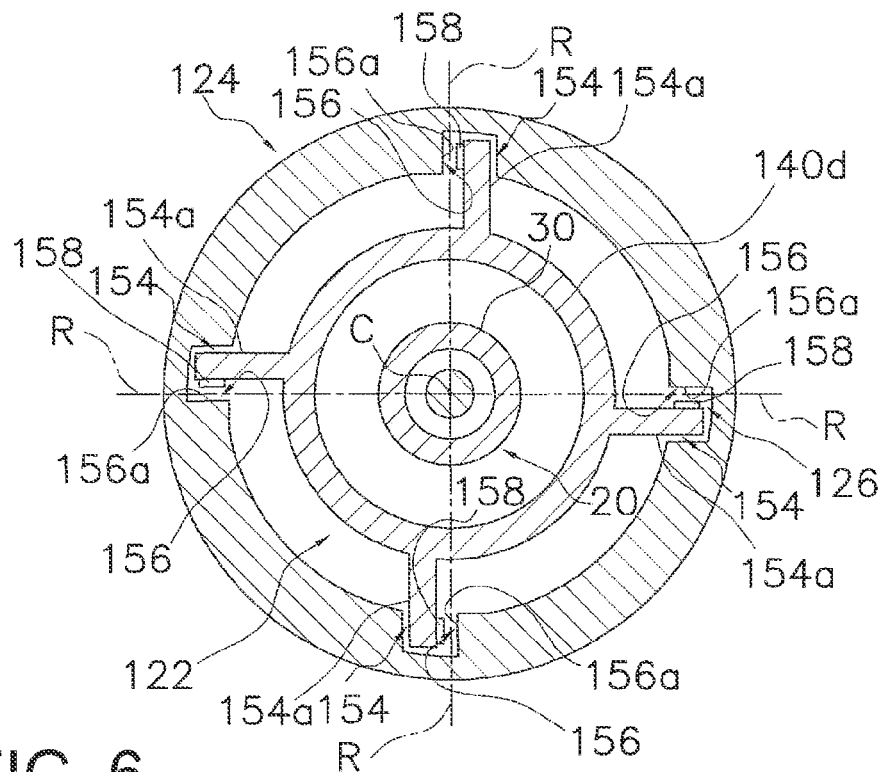
FIG. 6 is a cross-sectional view of the bicycle rear hub taken along section line VI-VI in FIG. 5.

A tip end of the coupling member 152 is coupled integrally with a protrusion 124f, which protrudes from an inner circumferential section of a middle portion of the hub shell 124 to an inner side in the radial direction side, so as to be able to rotate. The protrusion 124f May be formed inuring shape, and for example, is formed to open a gap in the circumferential direction. Several holes 152c are formed in a middle section of the coupling member 152 to be separated by a gap in the circumferential direction. The holes 152c are provided to penetrate through the coupling member 152. The function of the hole 152c is the same as in the first embodiment. As shown in FIG. 6, the first opposed part 154 is provided to be close to a spindle reception supporting section 124d. The first opposed part 154 is provided more to the first edge side of the hub shell 124 than the spindle reception supporting section 124d. There is an arm section 154a which extends toward the hub shell 124 from an outer circumferential surface of a second cylinder section 140c at a boundary portion of the second cylinder section 140c and the coupling member 152. A sensor 158 is provided in the first opposed part 154. The first opposed part 154 is formed integrally with the first member 140.

The second opposed part 156 has an opposing concave section 156a which is formed by a recess in the inner circumferential section of the hub shell 124. The opposing concave section 156a is formed by a recess so as to encompass a tip edge portion of the first opposed part 154. It is preferable that opposing surfaces, where the arm section 154a of the first opposed part 154 and the opposing concave section 156a of the second opposed part 156 oppose each other in the rotation direction, be arranged to be parallel.

As shown in FIG. 6, a plurality of the first opposed part 154 and the second opposed part 156 are arranged to be opposed to interpose a plurality of virtual radial lines R which extend in a radiating direction from a center axis line C of the hub spindle 20 on a plane which is orthogonal to the center axis line. In FIG. 6, a case is shown where there are four virtual radial lines and a case is shown where four of each of the first opposed part 154 and the second opposed part 156 are provided. The second opposed part 156 is provided in the same number as the first opposed part 154. It is preferable that the plurality of pairs of the first opposed part 154 and the second opposed part 156 be provided in positions which are rotationally symmetrical around the center axis line C of the hub spindle 20. In addition, it is preferable that the plurality of first opposed parts 154 be provided such that the distances to the adjacent first opposed part 154 be equal in the circumferential direction and that the plurality of second opposed part 156 be provided on as the distances to the adjacent second opposed part 156 be equal in the circumferential direction.

The driving force measuring part 126 has the sensor 158. In this embodiment, the sensor 158 is provided in the first opposed part 154. More specifically, the sensor 158 is provided in a portion which opposes the second opposed part 156 in the rotation direction at a tip end of the first opposed part 154. The sensor 158 is an optical type of sensor. The sensor 158 irradiates light such as laser light toward the second opposed part 156 and detects reflected light from the second opposed part 156. By detecting phase difference in the irradiated light and the reflected light using the sensor 158, it is possible to measure the gap between the first opposed part 154 and the second opposed part 156 or the displacement of the gap. A reflection section which effectively reflects the light from the sensor 158 may be provided in the second opposed part 156. The reflection section may be formed using a coating material or a member with a seal form may be adhered. Here, the sensors 158 are connected in series or in parallel.

The power generator 160 is a power source which supplies power to the wireless transmission section 128 and the sensor 158. The power generator 160 has a magnet 162 which is fixed to an outer circumferential section of the spindle body 30 of the hub spindle 20 and a rotor 164 which is arranged to oppose the magnet 162 at an outer circumferential side of the magnet 162. The rotor 164 has a coil bobbin which is fixed to an inner circumferential section of the hub shell 124, a coil which is wound around the coil bobbin, and a yoke which is arranged in the surroundings of the coil. The power generator 160 is used as a power source by the output of the coil being rectified to a direct current in the wireless transmitter 28.

Even in the second embodiment such as this, in the same manner as the first embodiment, since the gap between the first opposed part 154 and the second opposed part 156 or the displacement of the gap is detected using the sensor 158, it is possible to facilitate assembly.

Figure 7:
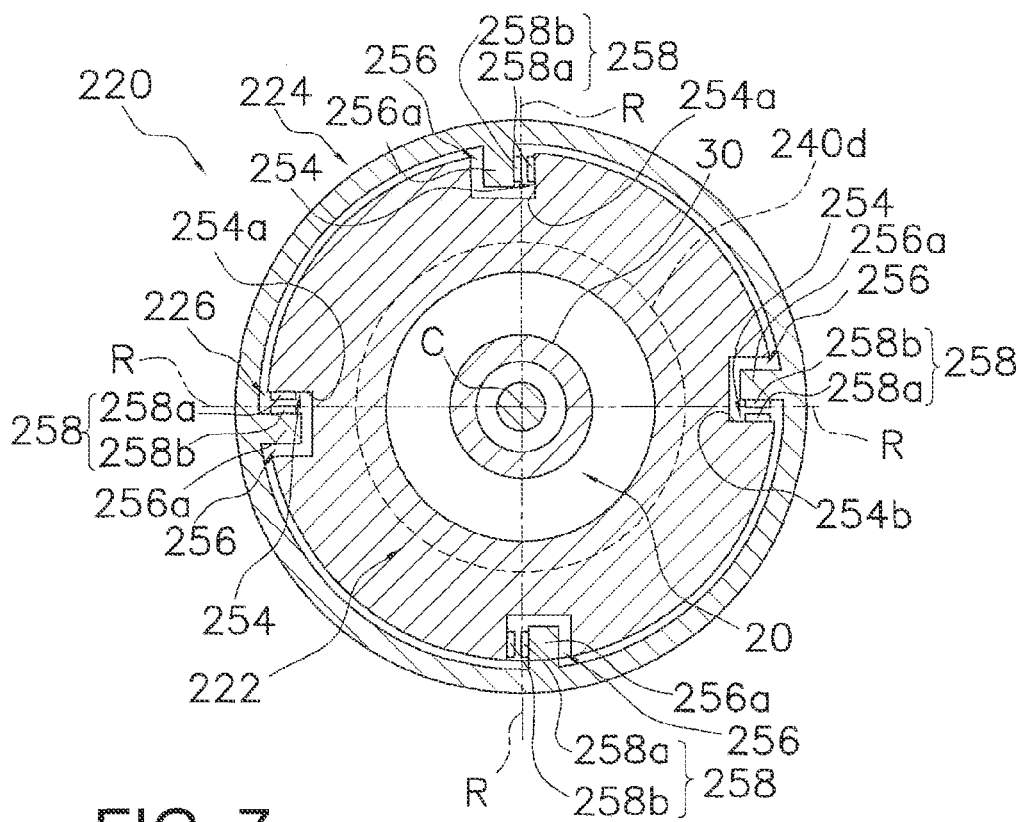
FIG. 7 is a cross-sectional view, corresponding to FIG. 2, of a main portion of a bicycle rear hub in accordance with a third embodiment.

The third embodiment is different to the first embodiment only in the shape of the first opposed part and the configuration of the sensor. As shown in FIG. 7, in the third embodiment, a second opposed part 256 which is provided in a hub shell 224 is a shape which is the same as the first opposed part 54 in the first embodiment shown in FIG. 1. In the third embodiment, a first opposed part 254 is provided in an outer circumferential section of a ring member 254a which is provided in a drive part 222. The ring member 254a is provided in a third cylinder section 240d and is formed integrally with the first member 40. The first opposed part 254 has an opposing concave section 254b which is formed due to a recess in the ring member 254a. The opposing concave section 254b is formed due to a recess so as to encompass a tip edge portion of the second opposed part 256. It is preferable that opposing surfaces, where the opposing concave section 254b of the first opposed part 254 and the second opposed part 256 oppose each other in the rotation direction, be arranged to be parallel.

As shown in FIG. 7, a plurality of the first opposed part 254 and the second opposed part 256 are arranged to be opposed to interpose a plurality of virtual radial lines R which extend in a radiating direction from a center axis line C of the hub spindle 20 on a plane which is orthogonal to the center axis line. In FIG. 7, a case is shown where there are four virtual radial lines and a case is shown where four of each of the first opposed part 254 and the second opposed part 256 are provided. The second opposed part 256 is provided in the same number as the first opposed part 254. It is preferable that the plurality of pairs of the first opposed part 254 and the second opposed part 256 be provided in positions which are rotationally symmetrical around the center axis line C of the huh spindle 20. In addition, it is preferable that the plurality of first opposed parts 254 be provided such that the distances to the adjacent first opposed part 254 be equal in the circumferential direction and that the plurality of second opposed part 256 be provided such that the distances to the adjacent second opposed part 256 be equal in the circumferential direction.

The driving force measuring part 226 has a sensor 258. In this embodiment, the sensor 258 is provided in the first opposed part 254. Specifically, the sensor 258 is provided in a portion which opposes the second opposed part 256 in the rotation direction at the opposing concave section 254b of the first opposed part 254. The sensor 258 is an electrostatic capacity type of sensor. The sensor 258 has a first electrode 258a which configures a positive electrode of a condenser and a second electrode 258b which is arranged to oppose the first electrode 258a and configures a negative electrode of the condenser. The first electrode 258a is mounted on the first opposed part 254. The second electrode 258b is mounted on the second opposed part 256 so as to oppose the first electrode. It is possible to measure the gap between the first opposed part 254 and the second opposed part 256 or the displacement of the gap by utilizing the principle where the gap between the first electrode 258a and the second electrode 258b is inversely proportional to the electrostatic capacity by using the electrostatic capacity type of sensor 258.

Figure 8:
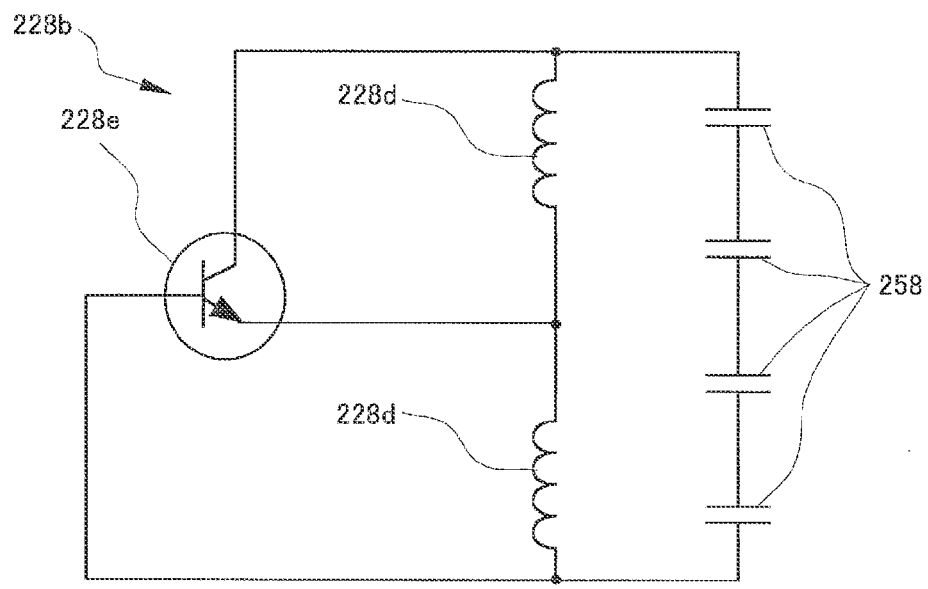
FIG. 8 is a view illustrating a connection format of a plurality of sensors and an example of a signal processing circuit in the third embodiment.

As shown in FIG. 8 the sensors 258 are connected in series. In FIG. 8, in a circuit substrate 228b of the driving force measuring part 226, two coils 228d connected in series, which are arranged in parallel with four of the sensors 258 connected in series, and a npn type of transistor 228e which is arranged in parallel with the two coils 228d. The base of the transistor 228e is connected to one end of the two coils 228d connected in series and a collector is connected to the other end of the two coils 228d connected in series. An emitter of the transistor 228e is connected to an intermediate node of the two coils 228d connected in series. An LC resonant circuit is configured by the sensors 258 and the coils and the output of the sensors 258 are amplified. It is possible to simplify the configuration since it is not necessary to separately provide a signal processing circuit which detects the signals from each of the sensors when the plurality of sensors 258 are connected in series and it is possible to reduce the consumption of current. In addition, it is possible to accurately detect the gap or the displacement of the gap since errors in the outputs of the plurality of sensors 258 which are arranged at different positions are offset.

Figure 9:
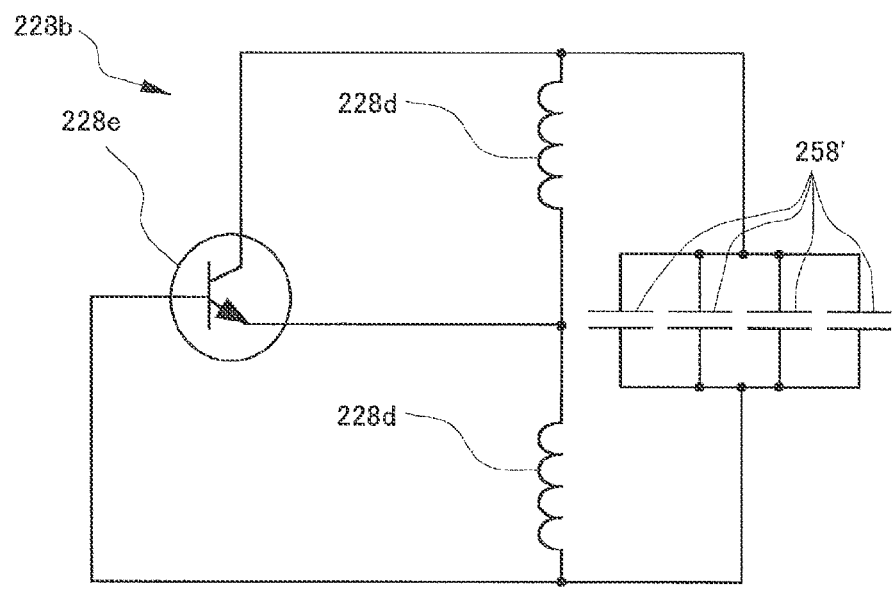
FIG. 9 is a cross-sectional view, corresponding to FIG. 8, of a main portion of a bicycle rear hub in accordance with a modified example of the third embodiment.

In addition, in FIG. 9 according to a modified example of the third embodiment, four sensors 258' are connected in parallel. The modified example is the same configuration as the third embodiment shown in FIG. 8 excluding the point where the four sensors 258' connected in parallel and the two coils 228d connected in series are connected in parallel.

It is possible to simplify the configuration since it is not necessary to separately provide a signal processing circuit which detects the signals from each of the sensors when the plurality of sensors 258' are connected in parallel and it is possible to reduce the consumption of current. In addition, it is possible to accurately detect the gap or the displacement of the gap since the outputs of the plurality of sensors which are arranged at different positions are offset.

Even in the third embodiment such as this, in the same manner as the first embodiment and the second embodiment, since the sensor 258 detects the gap between the first opposed part 254 and the second opposed part 256 or the displacement of the gap, it is possible to facilitate assembly.

Figure 10:
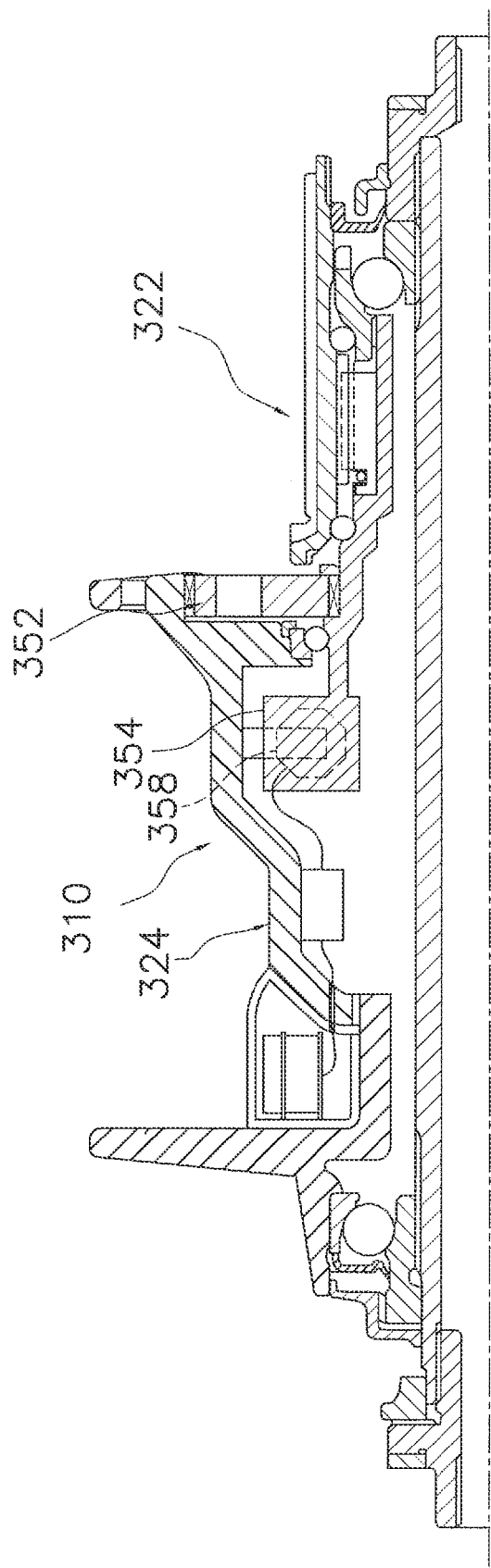
FIG. 10 is a cross-sectional view, corresponding to FIG. 2, of a main portion of a bicycle rear hub in accordance with a fourth embodiment.
Figure 11:
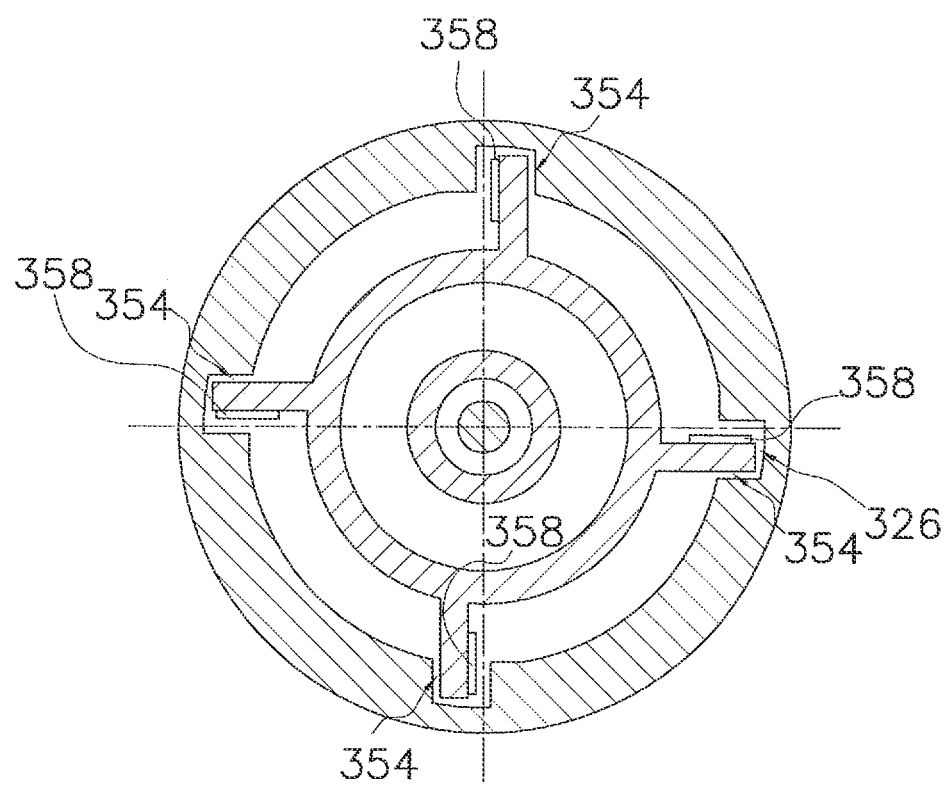
FIG. 11 is a cross-sectional view, corresponding to FIG. 4, of a main portion of a bicycle rear hub in accordance with the fourth embodiment.
Figure 12:
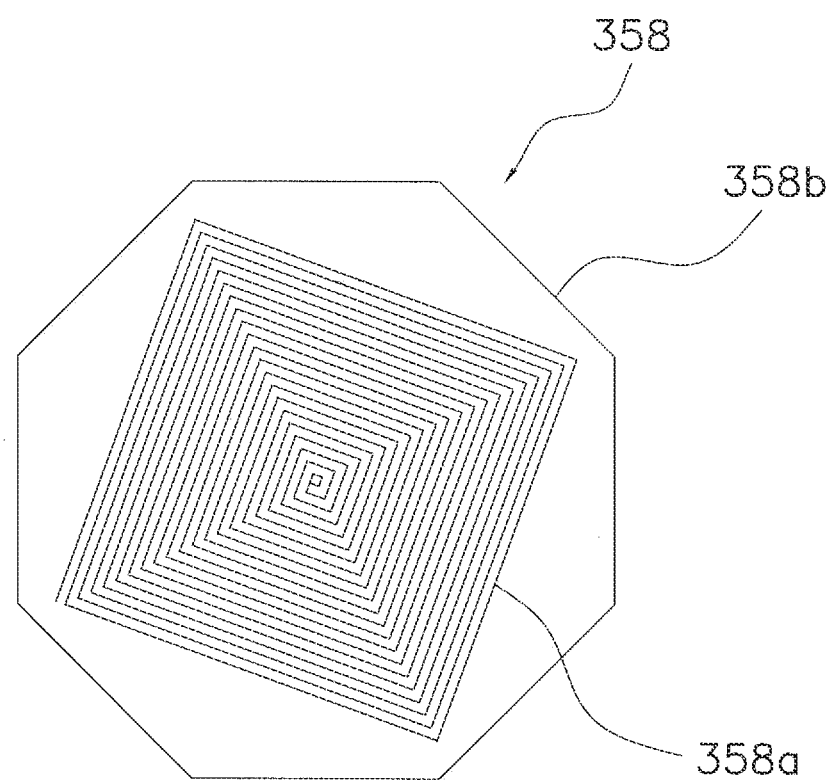
FIG. 12 is a planar view illustrating a sensor which uses a coil in the fourth embodiment.
Figure 13:
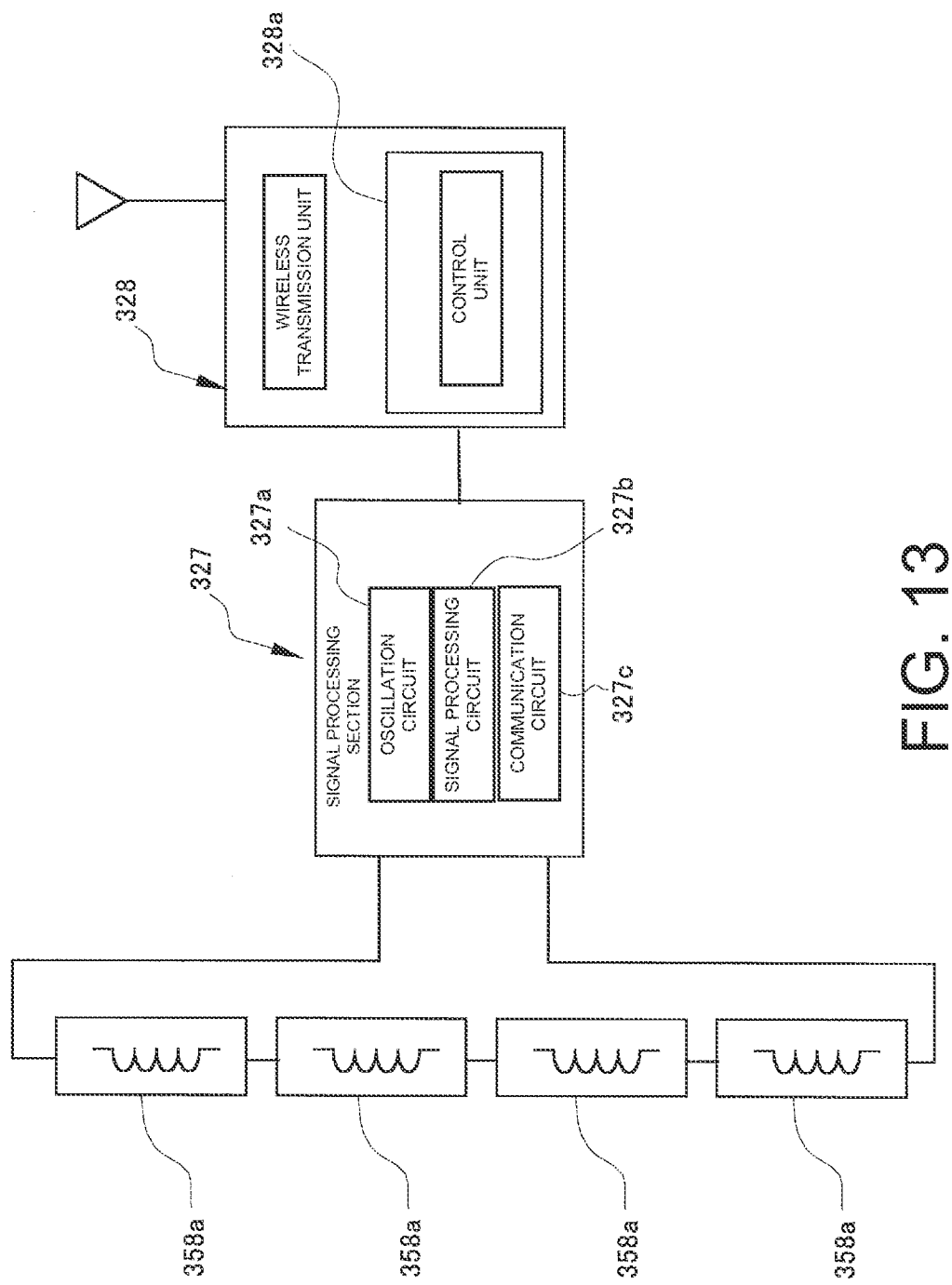
FIG. 13 is a block diagram illustrating a connection state of a coil in the fourth embodiment.

As shown in FIG. 10 and FIG. 11, in the same manner as the first embodiment shown in FIG. 2, in a bicycle rear hub 310 according to the fourth embodiment, the driving force of a drive part 322 is transferred to a hub shell 324 via a coupling member 352. Sensors 358 of a driving force measuring part 326 are provided in each of four first opposed parts 354. The sensor 358 is configured by a coil 358a which is formed in a substrate 358a as shown in FIG. 12. Four coils 358a are connected in series as shown in FIG. 13. The output signal from the four coils 358a connected in series is processed by a signal processing section 327 and is output to a wireless transmission section 328. The signal processing section 327 has an oscillation circuit 327a, a signal processing circuit 327b, and a communication circuit 327c. The oscillation circuit 327a oscillates the output from the coil 358a. The oscillation circuit 327a is realized using, for example, an LC oscillation circuit. The oscillation circuit 327a may be configured to include the coil 358a. The signal processing circuit 327b outputs a signal which is oscillated by the oscillation circuit 327a to the wireless transmission section 328 via the communication circuit 327c by being converted to serial data. The wireless transmission section 328 has a control section 328a which includes a microcomputer. The wireless transmission section 328 wirelessly transmits the signal indicating the driving force which is processed by the signal processing section 327. Here in the fourth embodiment, the signal processing section 327 is arranged on an inner side of the hub shell 324 as shown in FIG. 10. The wireless transmission section 328 is arranged on an outer side of the hub shell 324 and is covered by a cover. The cover is formed using a material which radio waves pass through and is formed using, for example, a synthetic resin. The signal processing section 327 also may be arranged on an outer side of the hub shell 324 in the same manner as the wireless transmission section 328, and the signal processing section 327 and the wireless transmission section 328 may be formed on one substrate.

In the fourth embodiment, it is possible to simplify the configuration since the sensors 358 are configured by the four coils 358a being connected in series and it is possible to reduce the consumption of current. In addition, it is possible to accurately detect the gap or the displacement of the gap since errors in the outputs of the plurality of sensors 358 which are arranged at different positions are offset.

Figure 14:
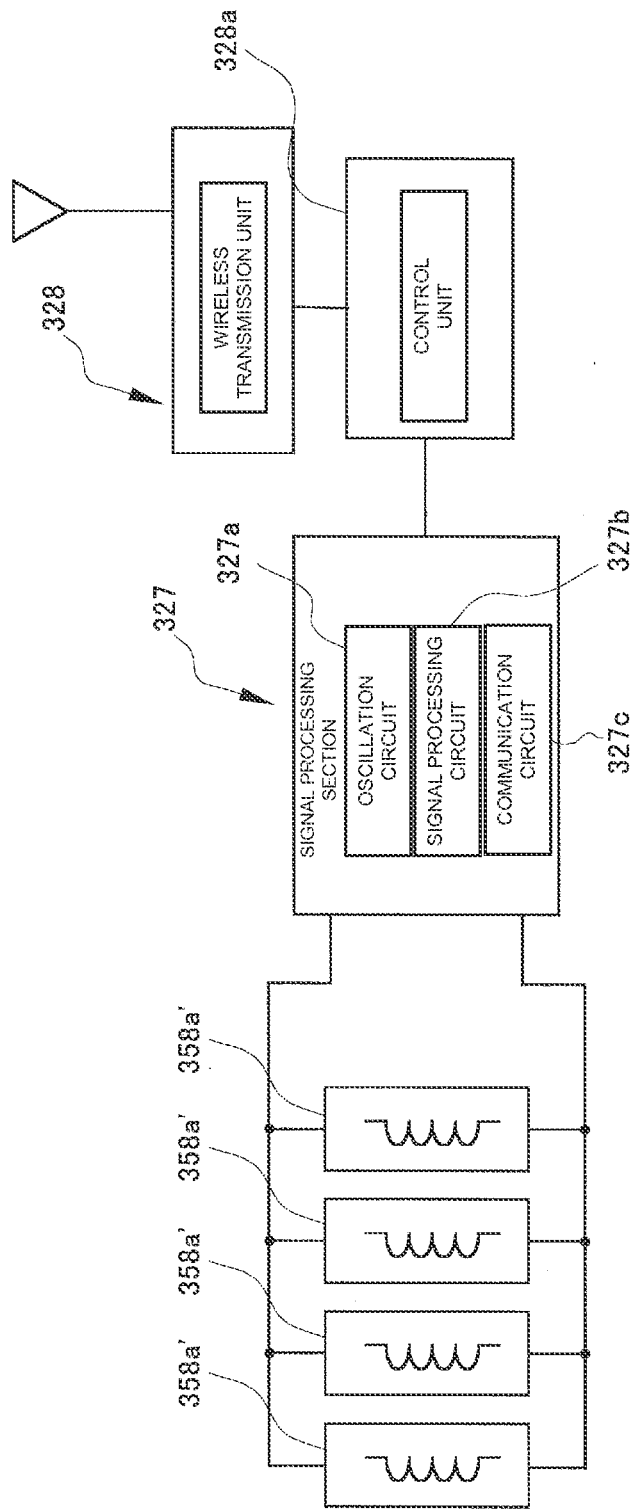
FIG. 14 is a cross-sectional view, corresponding to FIG. 13, of a main portion of a bicycle rear hub in accordance with a modified example of the fourth embodiment.

In a first modified example of the fourth embodiment, the point where four coils 358a' are connected in parallel as shown in FIG. 14 is different from the fourth embodiment. It is possible to simplify the configuration since it is not necessary to separately provide a signal processing circuit which detects the signals from each of the sensors when the four coils 358a' are connected in parallel and it is possible to reduce the consumption of current. In addition, it is possible to accurately detect the gap or the displacement of the gap since the outputs of the plurality of sensors which are arranged at different positions are offset.

Figure 15:
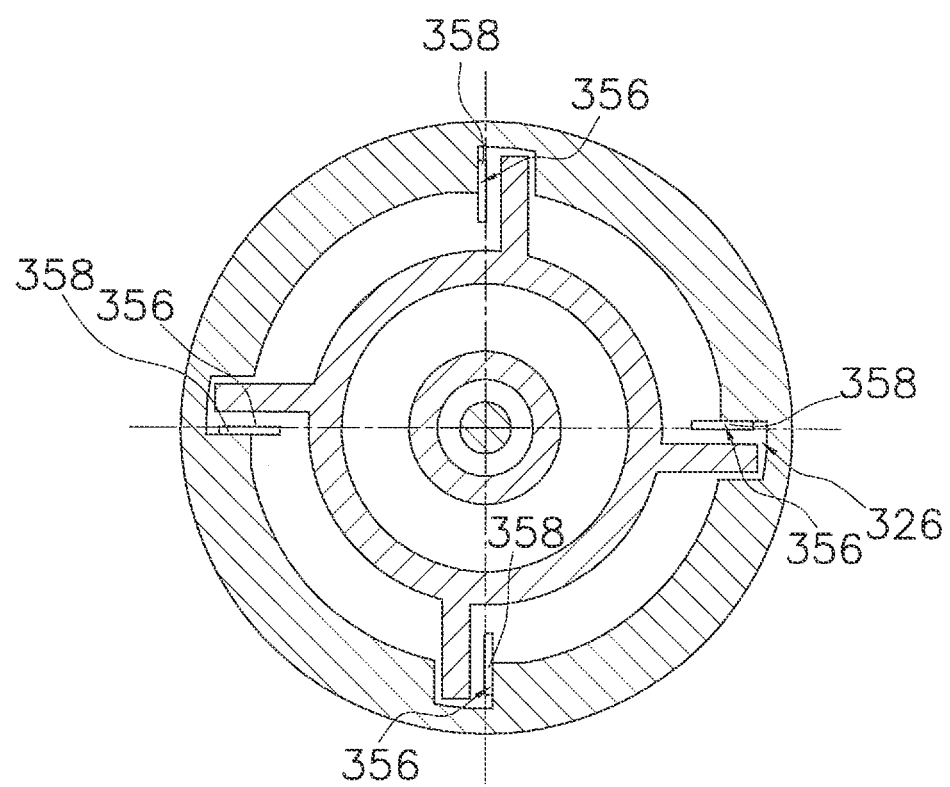
FIG. 15 is a cross-sectional view, corresponding to FIG. 4, of a main portion of a bicycle rear hub in accordance with a modified example of the fourth embodiment.

In a second modified example of the fourth embodiment, the point where the coil 358a which configures the sensor 358 is provided on the second opposed part 356 and not the first opposed part 354 as shown in FIG. 15 is different from the fourth embodiment. Due to this, since the coil 358a is provided in the hub shell 324 in the same manner as the signal processing section 327, the wiring of the coil 358a and the signal processing section 327 is easy.

Figure 16:
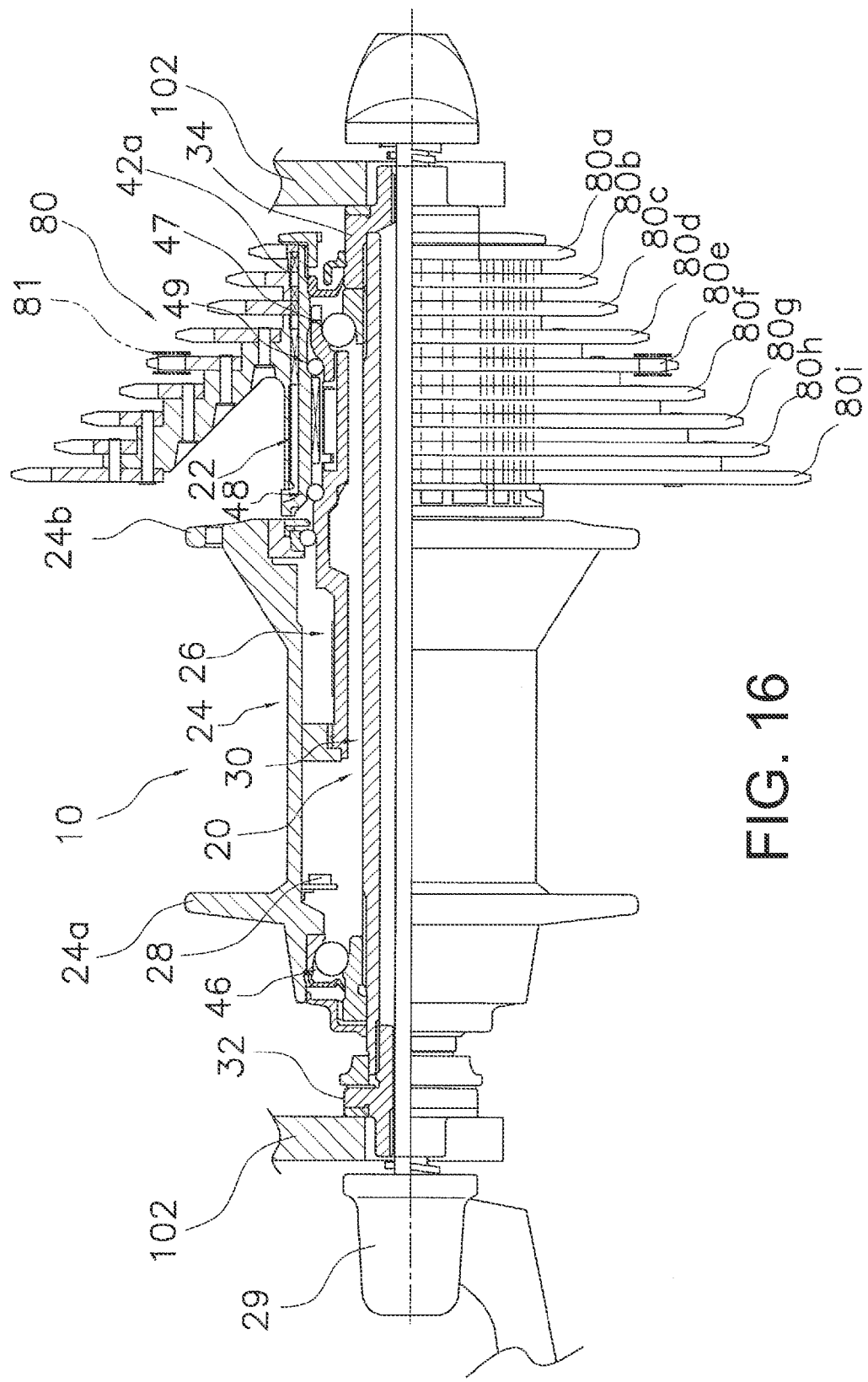
FIG. 16 is a half cross sectional view of a bicycle rear hub according to a fifth embodiment.

As shown in FIG. 16, a bicycle rear hub 10 according to a fifth embodiment of the present invention is able to be mounted onto a hub spindle mounting section 102 which is provided at a rear section of a frame of a bicycle. The rear hub 10 is provided with a hub spindle 20, a drive part 22, a hub shell 24, a driving force measuring part 26, and a wireless transmitter 28. The hub shell 24 is supported in the hub spindle 20 so as to rotate freely using a first bearing 46. The drive part 22 is supported in the hub spindle 20 so as to rotate freely using a second bearing 47. The driving force measuring part 26 is able to measure the driving force of a rider. The wireless transmitter 28 wirelessly transmits information related to the driving force which is measured. The information related to the driving force which is wirelessly transmitted is displayed on, for example, a cycle computer (not shown) which is able to be mounted on a handle section of the bicycle. Here, in the cycle computer, information such as the speed of the bicycle, the rotation speed of a crank (cadence), the distance travelled, and the like is also displayed.

The hub spindle 20 has a hollow spindle body 30 where a quick release mechanism 29 is mounted, a first lock nut 32 which is mounted to a first end (an end on the left side of FIG. 16) of the spindle body 30, and a second lock nut 34 which is mounted to a second end (an end on the right side of FIG. 16) of the spindle body 30. The hub spindle mounting section 102 is able to be mounted to the first lock nut 32 and the second lock nut 34. Here, a configuration where the first lock nut 32 and the second lock nut 34 are mounted to the mounting section 102 is described, but there may be a configuration where the spindle body 30 is mounted to the hub spindle mounting section 102 on the frame.

Figure 17:
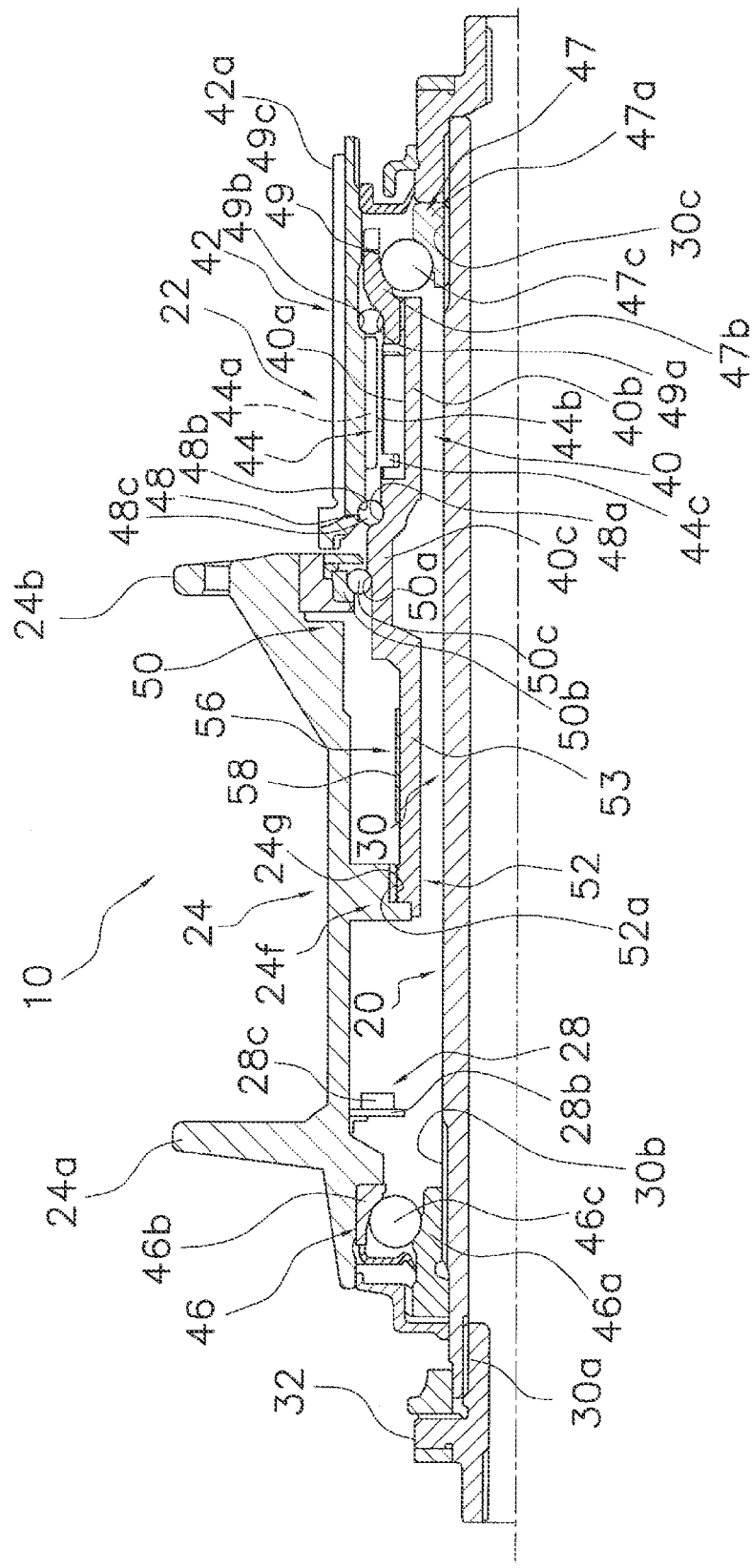
FIG. 17 is a cross-sectional view of a main portion of the bicycle rear hub in FIG. 16.

As shown in FIG. 17, a female screw section 30a is formed in an inner circumferential surface of the first edge of the spindle body 30. A first male screw section 30b and a second male screw section 30c are respectively formed in outer circumferential surfaces of the first and second ends of the spindle body 30. The first lock nut 32 has a male screw section which screws together with the female screw section 30a and is fixed by being screwed to the spindle body 30. The second lock nut 34 has a female screw section which screws together with the male screw section 30c and is fixed by being screwed to the spindle body 30.

The drive part 22 is configured to include a so-called freewheel. The drive part 22 has a first member 40 which is supported in the hub spindle 20 so as to rotate freely, a second member 42 which is arranged at an outer circumferential side of the first member 40, a one-way clutch 44 which is arranged between the first member 40 and the second member 42, a coupling member 52, and a target measurement section 53. The first member 40 is an example of an inner side cylindrical section and the second member section 42 is an example of an outer side cylindrical section.

The first member 40 is a cylindrical member which is supported in the hub spindle 20 so as to rotate freely using the second bearing 47. Here, the first member 40 is formed in a circular cylinder shape. The second bearing 47 has a second inner ring body 47a, a second outer ring body 47b, and a plurality of second rolling elements 47c. The second inner ring body 47a has a screw formed in an outer circumferential section and is fixed by being screwed to the second male screw section 30c of the spindle body 30. The second outer ring body 47b has a screw formed in an inner circumferential section and is fixed by being screwed to a male screw section which is formed in an outer circumferential surface of the first member 40. The plurality of the second rolling elements 47c are provided to be separated by a gap in the circumferential direction between the second inner ring body 47a and the second outer ring body 47b. The second rolling elements 47c are arranged to open a predetermined gap in the circumferential direction by being held on a retainer (not shown) so as to be able to rotate. The second rolling elements 47c may be spherical or may be rollers.

The first member 40 has a first cylinder section 40b which is provided with a concave section 40a where a clutch claw 44a of the one-way clutch 44 is accommodated. A first end (an end on the left side of FIG. 17) of the first member 40 extends until the inner circumferential side of the hub shell 24. The first member 40 has a second cylinder section 40c in the first end side (left side in FIG. 17) of the first cylinder section 40b. The second cylinder section 40c has a larger diameter than the first cylinder section 40b. The second cylinder section 40c may have the same diameter as the first cylinder section 40b. The second outer ring body 47b of the second bearing 47 is fixed to a second end (an end on the right side of FIG. 17) of the first cylinder section 40b. A third inner ring surface 48a which configures a third bearing 48 is formed in an outer circumferential section on a boundary portion of the first cylinder section 40b and the second cylinder section 40c. A fifth inner ring surface 50a of a fifth bearing 50, which is for supporting the hub shell 24 so as to rotate freely on the drive part 22, is formed in an outer circumferential surface of the second cylinder section 40c.

The second member 42 is a cylindrical member which is supported so as to rotate freely with respect to the first member 40 using the third bearing 48 and the fourth bearing 49. Here, the second member 42 is formed in a circular cylinder shape. The third bearing 48 is formed by a third inner ring surface 48a as described above, a third outer ring surface 48b, and a plurality of third rolling elements 48c. The third outer ring surface 48b is formed at an inner circumferential surface of a first end (an end on the left side of FIG. 17) of the second member 42. The plurality of third rolling elements 48c are provided to be separated by a gap in the circumferential direction between the third inner ring body 48a and the third outer ring body 48b. The third rolling elements 48c are arranged to open a predetermined gap in the circumferential direction by being held on a retainer (not shown) so as to be able to rotate. The third rolling elements 48c may be spherical or may be rollers.

The fourth bearing 49 is formed by a fourth inner ring surface 49a which is formed at an outer circumferential surface of the second outer ring body 47b, a fourth outer ring surface 49b, and a plurality of fourth rolling elements 49c. The fourth outer ring surface 49b is formed at an inner circumferential surface of a middle section of the second member 42 in the hub spindle direction. The plurality of fourth rolling elements 49c are provided to be separated by a gap in the circumferential direction between the fourth inner ring body 49a and the fourth outer ring body 49b. The fourth rolling elements 49c are arranged to open a predetermined gap in the circumferential direction by being held on a retainer (not shown) so as to be able to rotate. The fourth rolling elements 49c may be spherical or may be rollers.

As shown in FIG. 16, the second member 42 has a sprocket mounting section 42a where a sprocket assembly 80 is mounted at an outer circumferential surface. The sprocket assembly 80 rotates integrally with the second member 42. The sprocket assembly 80 is an example of a driving-force-input member. The sprocket mounting section 42a has, for example, a spline which has a convex section or a concave section arranged to be separated by a gap in the circumferential direction in an outer circumferential section. The sprocket assembly 80 has a plurality of sprockets 80a to 80i (for example, nine) with a different number of teeth. The rotation of a crank (not shown) is transferred to the drive part 22 using a chain 81 which meshes with any of the sprockets in the sprocket assembly 80. Here, the plurality of sprockets are mounted in the sprocket mounting section 42a, but the number of sprockets which are mounted in the sprocket mounting section 42a may be one.

The one-way clutch 44 is provided in order to transfer only rotation of the second member 42 in the travelling direction of the bicycle to the first member 40. Due to this, only rotation in the travelling direction of the crank is transferred to the hub shell 24. In addition, the rotation in the travelling direction of the hub shell 24 is not transferred to the second member 24. The one-way clutch 44 has the clutch claw 44a which is provided so as to swing freely to a first positioning and a second positioning in the concave section 40a, a ratchet tooth 44b which is formed in the inner circumferential surface of the second member 42, and a pressing member 44c which presses the clutch claw 44a. The clutch claw 44a comes into contact with the ratchet tooth 44b at the first positioning and is separated from the ratchet tooth 44b at the second positioning. The pressing member 44c is mounted in a ring groove which is formed in the first member 40. The pressing member 44c is a spring member which is formed by a metal wire material being bent into a C shape and presses the clutch claw 44a to the first positioning side.

The coupling member 52 is coupled to the hub shell 24 and is provided on a driving force transferring path which spans from the drive part 22 to the hub shell 24. In this embodiment, the coupling member 52 is provided between an inner circumferential section of the hub shell 24 and the target measurement section 53 at a middle portion of the hub shell 24 in the axis direction. The coupling member 52 has a male screw section 52a in an outer circumferential surface. The male screw section 52a screws together with a female screw section 24g which is formed in an inner circumferential surface of a protrusion 24f with a ring shape, which will be described later, in the hub shell 24. Accordingly, the coupling member 52 is fixed by being screwed to the hub shell 24. The hub shell 24 and the coupling member 52 may be further joined using a fastening member (not shown) which prevents the rotation of the hub shell 24 and the coupling member 52 around the hub spindle. The fastening member may be formed using a cylindrical bolt, and in this case, there is a configuration where a part of the protrusion 24$f$ is interposed by the head section of the bolt and the coupling member 52 by a female screw being formed in an inner circumferential surface of an end of the coupling member 52. In addition, the fastening member may be formed using a nut, and in this case, there is a configuration where a part of the protrusion 24$f$ is interposed by the nut and the coupling member 52 by a female screw being formed in an outer circumferential surface of an end of the coupling member 52.

The target measurement section 53 is provided in order to measure the driving force and is formed integrally with the first member 40. The target measurement section 53 extends toward the coupling member 52 from the second cylindrical section 40$c$ of the first member 40. The target measurement section 53 is formed in a cylindrical shape, and here, is formed in a circular cylinder shape. The target measurement section 53 has a diameter which is smaller than the diameter of the second cylinder section 40$c$. The target measurement section 53 is formed integrally with the coupling member 52.

As shown in FIG. 17, a first end (an end on the left side in FIG. 17) of the hub shell 24 is supported in the spindle body 30 of the hub spindle 20 so as to rotate freely using the first bearing 46. A second end (an end on the right side in FIG. 17) of the hub shell is supported in the spindle body 30 of the hub spindle 20 so as to rotate freely via the drive part 22 using the fifth bearing 50 as described above. A fifth outer ring body 50$b$ of the fifth bearing 50 is mounted to the second end of the hub shell. The first bearing 46 has a first inner ring body 46$a$ which has a screw formed in an inner circumferential surface and is fixed by being screwed to the first male screw section 30$b$ of the spindle body 30, a first outer ring body 46$b$, and a plurality of first rolling elements 46$c$. The first rolling elements 46$c$ are arranged to open a predetermined gap in the circumferential direction by being held on a retainer (not shown) so as to be able to rotate. The first rolling elements 46$c$ may be spherical or may be rollers.

The fifth bearing 50 has a fifth inner ring surface 50$a$ as described above, a fifth outer ring surface 50$b$ which is, for example, pressed and fixed to an inner circumferential section of the second end of the hub shell 24, and a plurality of fifth rolling elements 50$c$. The plurality of fifth rolling elements 50$c$ are provided to be separated by a gap in the circumferential direction between the fifth inner ring body 50$a$ and the fifth outer ring body 50$b$. The fifth rolling elements 50$c$ are arranged to open a predetermined gap in the circumferential direction by being held on a retainer (not shown) so as to be able to rotate. The fifth rolling elements 50$c$ may be spherical or may be rollers.

In an outer circumferential surface of the hub shell 24, a first hub flange 24$a$ and a second hub flange 24$b$ for linking to the spokes of the rear wheel of the bicycle are formed to protrude in a ring shape to be separated by a gap in the axis direction of the hub spindle 20. The protrusion section 24$f$ which engages with the outer circumferential surface of the coupling member 52 is formed in an inner circumferential surface of a middle section of the hub shell 24 in the axis direction. The female screw section 24$g$ which screws together with the male screw section 52$a$ is formed in an inner circumferential surface of the protrusion 24$f$. The hub shell 24 may be configured so that a part thereof is able to be separated for assembly. In the embodiment, the protrusion 24$f$ is formed in a center section of the hub shell 24 in the hub spindle direction.

The driving force measuring part 26 has at least one sensor 58. The sensor 58 is able to measure the amount of twisting in the target measurement section 53. The sensor 58 is, for example, a strain gauge or a semiconductor sensor which is able to detect distortion. The sensor 58 is, for example, fixed to the target measurement section 53 using an appropriate fixing means such as adhesion. The sensor 58 is provided in an outer circumferential surface of the target measurement section 53. For example, the sensors 58 are provided on a plurality of locations (for example, in four locations) to be separated with a gap in the circumferential direction. In a case where a distortion gap is used as the sensor 58, a plurality of strain gauges are provided at each arrangement location of the sensors 58 and each of the strain gauges detect distortion in directions which are different to each other, that is, directions which are different by 90°. In addition, each of the strain gauges detect distortion in, for example, a direction which is inclined with respect to the axis direction of the rear hub 10, for example, a direction which is inclined by 45°. Here, the strain gauges in each of the arrangement locations are connected in a bridge shape so that noise is cancelled out.

The wireless transmitter 28 has a circuit substrate 28$b$ which is fixed to an inner circumferential section or an outer circumferential section of the hub shell 24. The sensor 58 and the circuit substrate 28$b$ are electrically connected by a wire (not shown). In the circuit substrate 28$b$, electronic components such as a microcomputer, an amplifier which amplifies the output from the sensor 58, an AD (Analog-Digital) conversion circuit which converts the signal which is amplified by the amplifier into a digital signal, and a wireless transmission circuit, and a rechargeable battery 28$c$ as a power source are mounted. In this embodiment, the microcomputer, the amplifier, and the AD conversion circuit are configured as a part of the driving force measuring part 26.

The wireless transmitter 28 wirelessly transmits information based on the output of the sensor 58. The information which is wirelessly transmitted from the wireless transmitter 28 is displayed as at least any of the driving force, the torque, or the power using a cycle computer (not shown). At least any of the driving force, the torque, or the power may be calculated in the microcomputer which is provided in the circuit substrate 28$b$ based on the output of the sensor 58, and at least any of the driving force, the torque, or the power may be calculated in the cycle computer based on the information which is received. Instead of the rechargeable battery 28$c$, a primary battery may be provided. The rechargeable battery 28$c$ or the primary battery is provided in the circuit substrate 28$b$ to be freely attachable and detachable.

In the rear hub 10 which is configured in this manner, when attached to the bicycle and the rider pedals, tread force of the rider is transferred from the drive part 22 to the hub shell 24 as the driving force. At this time, the target measurement section 53 is slightly twisted and the amount of twisting changes according to the driving force. Specifically, when the driving force is large, the amount of twisting of the target measurement section 53 is large. The output of the sensor 58 changes according to the amount of twisting of the target measurement section 53. The wireless transmitter 28 processes the information on the driving force according to the output of the sensor 58 and the wireless transmitter 28 wirelessly transmits to the cycle computer. The information which represents the driving force which has been wirelessly transmitted is received and displayed in the cycle computer. Due to this, it is possible for the rider to know the driving force, the torque, the power, and the like which is generated by the rider.

Here, due to the first member 40 and the target measurement section 53 being integrally configured, noise which is measured by the driving force measuring part 26 is reduced, it is possible to improve the measurement accuracy since it is difficult for deviation in the twisting of the target measurement section to occur, and it is possible to lighten the weight compared to a case where the first member 40 and the target measurement section 53 are configured to be separate.

Figure 18:
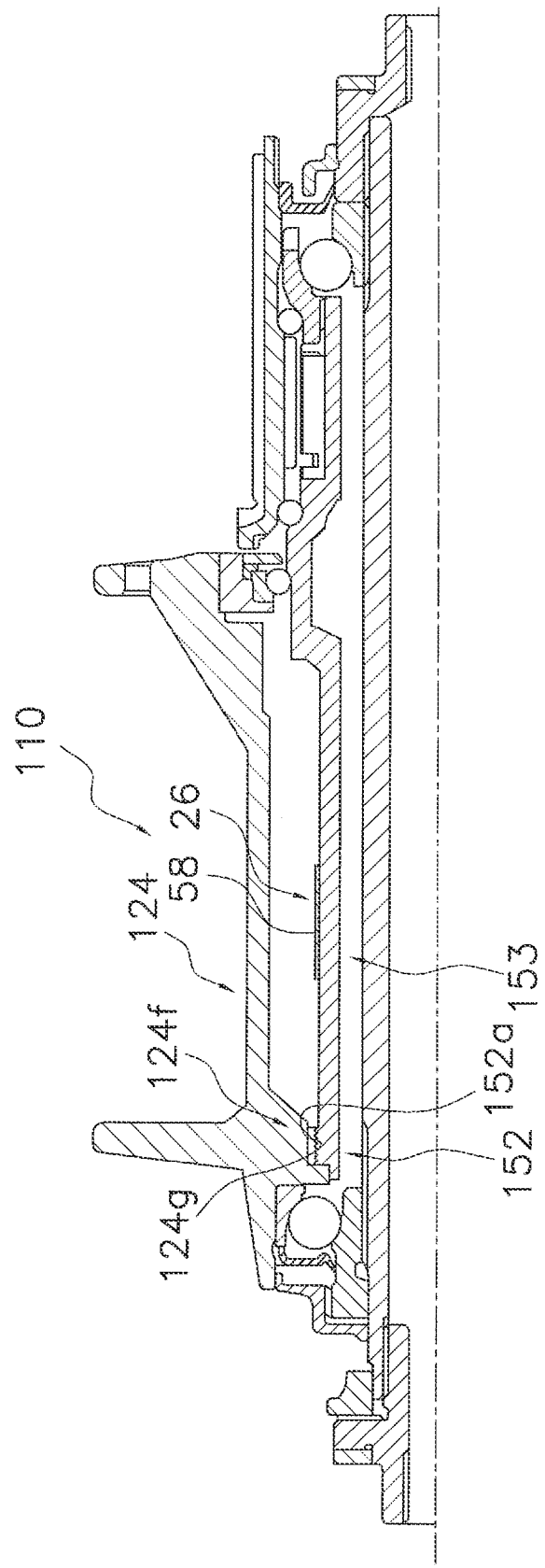
FIG. 18 is a cross-sectional view, corresponding to FIG. 17, of a main portion of a bicycle rear hub in accordance with a modified example of the fifth embodiment.
Figure 19:
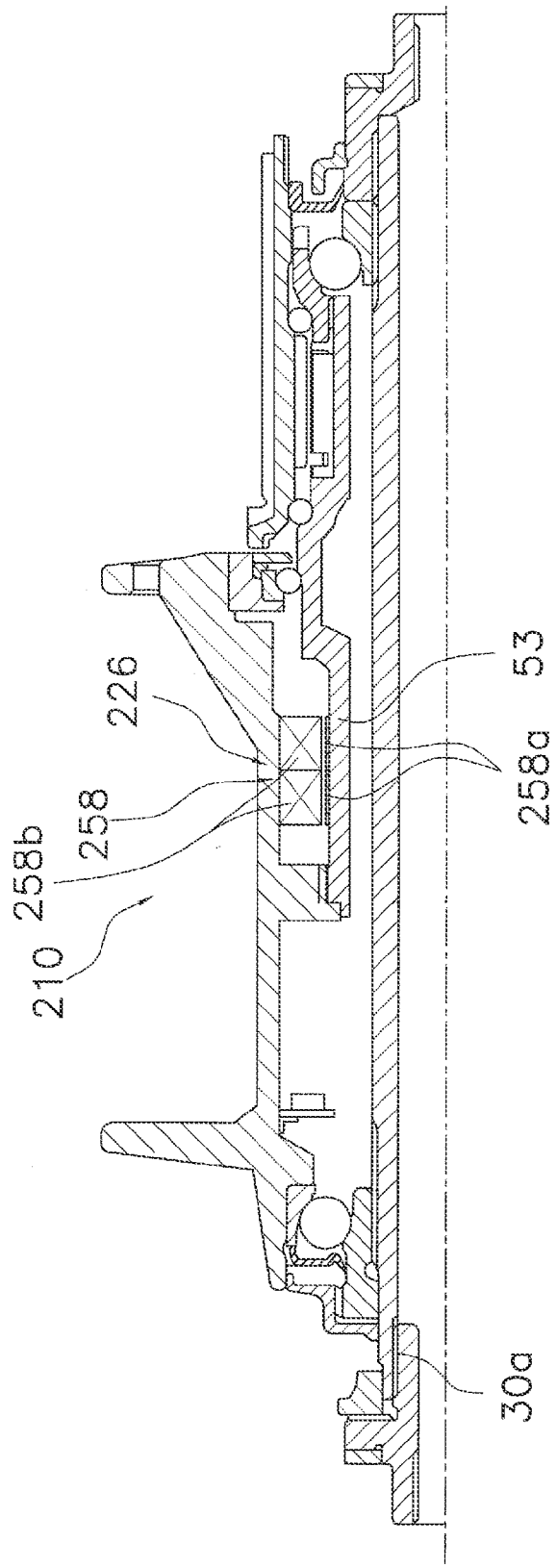
FIG. 19 is a cross-sectional view, corresponding to FIG. 17, of a main portion of a bicycle rear hub in accordance with a sixth embodiment.

In the fifth embodiment, the coupling member 52 is arranged in the middle portion of the hub shell 24 in the axis direction, but in a rear hub 110 which is a modified example shown in FIG. 18, a coupling member 152 which has a male screw section 152a is arranged in a first end (left end in FIG. 18) of a hub shell 124. A protrusion 124f which has a female screw section 124g is formed in the first end side of the hub shell 124. Here, since the length of a target measurement section 153 is long in the axis direction, it is possible for the twisting in the target measurement section 153 to be larger than in the embodiments described above and it is possible to use the sensor 58 with a low distortion detection sensitivity compared to the embodiments described above.

In the fifth embodiment, the strain gauge is used as the sensor which measures the twisting in the driving force measuring part 26, but the present invention is not limited thereto. In a rear hub 210 of the sixth embodiment shown in FIG. 119, a sensor 258 in a driving three measuring part 226 has a magnetostrictor 258a which provided in a target measurement section 253 and a detection coil 258b which is arranged at an outer circumference surface of the magnetostrictor 258a. The other configurations are the same as the fifth embodiment described above. The magnetostrictors 258a are provided in pairs so as to be orthogonal in the magnetostriction direction. The detection coils 258b are each provided in positions which are opposed to each of the magnetostrictors 258a and output a signal according to the twisting which occurs in the magnetostrictors 258a.

When the twisting is detected using the magnetostrictors 258a in this manner, it is possible to accurately detect the amount of twisting in the target measurement section 253.

Above, the embodiments of the present invention have been described, but the present invention is not limited to the embodiments described above and various modifications are possible within a range which does not depart from the gist of the invention.

In the embodiments described above, the drive part 22 is configured to include a so-called free hub which has a one-way clutch, but the present invention is not limited thereto. For example, the present invention is able to be applied to a rear hub which does not have a free hub.

In the embodiments described above, the rear hub which has the quick release mechanism 29 is exemplified, but the present invention is able to be applied to a rear hub which does not have a quick release mechanism.

In the embodiments described above, the sensor is arranged in the first opposed part 54, but the sensor may be arranged in the second opposed part.

The eddy current type of sensor is exemplified as the sensor 58 in the first embodiment, the optical type of sensor is exemplified as the sensor in the section embodiment, and the electrostatic capacity type of sensor is exemplified in the third embodiment, but the present invention is not limited thereto. The sensor may be any sensor as long as it is able to measure the distance between the first opposed part and the second opposed part or the displacement of the distance. For example, the sensor may be an ultrasound wave sensor.

In addition, for example, the sensor in the first embodiment may be an optical type of sensor or an electrostatic capacity type of sensor, the sensor in the second embodiment may be an eddy current type of sensor or an electrostatic capacity type of sensor, and the sensor in the third embodiment may be an optical type of sensor or an eddy current type of sensor.

In the embodiments described above, a power generator and a rechargeable battery are exemplified as power sources, but the present invention is not limited thereto. For example, an accumulation element such as a condenser which is able to be recharged may be used. In addition, a primary battery which is not able to be recharged may be used.

In the second embodiment, the power generator 60 is used to supply power to the sensor 58 and the wireless transmitter 28, but the present invention is not limited thereto. A rotation speed signal of the rear hub may be obtained in the wireless transmission section by detecting the alternating power waveform which is output from the power generator 60 in the wireless transmission section. The power may be calculated in the microcomputer using the information related to the rotation speed signal which is obtained and the torque which is the driving force which is measured by the driving force measuring part. In addition, due to the wireless transmission section transmitting the information related to the rotation speed signal to the cycle computer, it is possible to use in the bicycle speed display in the cycle computer by multiplying with the circumference of the rear wheel.

In the embodiments described above, the holes which penetrate through the coupling member are formed in the coupling member, hut concave sections may be formed instead of the through holes or there may be a configuration where the holes are not provided.

The first opposed part and the second opposed part in the first embodiment may be changed to the first opposed part and the second opposed part in the second or third embodiments. The first opposed part and the second opposed part in the second embodiment may be changed to the first opposed part and the second opposed part in the first or third embodiments. The first opposed part and the second opposed part in the third embodiment may be changed to the first opposed part and the second opposed part in the first or second embodiments.

In the embodiments described above, the portion which opposes the sensor in the second opposed part 56 is provided at the downstream side of the first opposed part in the rotation direction, but the portion which opposes the sensor in the second opposed part 56 is provided at the upstream side of the first opposed part in the rotation direction. The amount of twisting in the coupling member 52 is larger when the driving force increases and the first opposed part which is provided with the sensor is separated from the portion, which opposes the sensor, in the second opposed part. Even in this case, it is possible to detect the relative gap between the first opposed part and the second opposed part or the displacement of the gap.

In the embodiments described above, the first member 40 is provided with the plurality of cylindrical section with different diameters, but the first member may be configured to not be provided with the plurality of cylindrical section with different diameters. It is possible for the shape of the first member 40 to be arbitrarily changed to match the format of the bearings.

In the embodiments described above, any one or plurality of the first to fifth bearings may be change to sliding bearings. In this case, it is possible to lighten the weight.

In the embodiments described above, a portion which configures the freewheel in the first member may be configured to be freely attachable and detachable from the other portions. With a configuration such as this, it is possible for the freewheel to be freely exchanged. The portion which is able to be attachable and detachable in the first member may be joined with the other portion using a linking mechanism such as serration.

In the fifth and the sixth embodiments, the coupling member and the hub shell are coupled by being screwed and joined, but the coupling member and the hub shell may be coupled using serration in the same manner as the first to the fourth embodiments. Conversely, in the first to the fourth embodiments, the coupling member and the hub shell may be coupled by being screwed and joined instead of the serration.

In the fifth and the sixth embodiments, there is a configuration where the battery is provided as the power source, but a power generator may he provided as shown in FIG. 5 instead of the battery.

Thus, the foregoing descriptions of the embodiments according to the present invention are provided for illustration only, and not for the purpose of limiting the invention as defined by the appended claims and their equivalents.

What is claimed is:

1. A bicycle rear hub comprising:
a hub spindle;
a drive part rotatably supported on the hub spindle, and configured to receive a driving-force-input member;
a hub shell rotatably supported on the hub spindle and operatively coupled to the drive part for rotation by the drive part on the hub spindle;
at least one first opposed part coupled to the drive part;
at least one second opposed part coupled to the hub shell and being disposed oppose to the first opposed part with a gap therebetween; and
a driving force measuring part including at least one sensor arranged to measure at least one of the gap between the first and second opposed parts and a displacement of the gap.

2. The bicycle rear hub according to claim 1, wherein the first opposed part and the second opposed part are opposed in a rotation direction of the drive part and the hub shell.

3. The bicycle rear hub according to claim 1, wherein the first opposed part protrudes from an outer circumferential section of the drive part.

4. The bicycle rear hub according to claim 1, wherein the second opposed part protrudes from an inner circumferential section of the hub wheel.

5. The bicycle rear hub according to claim 1, wherein the drive part has a coupling member which is coupled to the hub shell.

6. The bicycle rear hub according to claim 5, wherein the coupling member is provided to be integrated with the first opposed part.

7. The bicycle rear hub according to claim 5, wherein the coupling member is provided to be separate to the first opposed part.

8. The bicycle rear hub according to claim 5, wherein the coupling member and the hub shell are joined using serration or adhesion.

9. The bicycle rear hub according to claim 5, wherein the coupling member and the hub shell are coupled at a central section of the hub shell in the hub spindle direction.

10. The bicycle rear hub according to claim 1, wherein the first opposed part includes a plurality of first units and the second opposed part includes a plurality of second units.

11. The bicycle rear hub according to claim 10, wherein the at least one sensor includes a plurality of the sensors in at least one of the plurality of the first and second units of the first and second opposed parts.

12. The bicycle rear hub according to claim 11, wherein the sensors are provided in the first opposed part.

13. The bicycle rear hub according to claim 11, wherein the sensors are provided in the second opposed part.

14. The bicycle rear hub according to claim 11, wherein at least one of the sensors is provided in each of the plurality of the first and second units of the first and second opposed parts.

15. The bicycle rear hub according to claim 10, wherein the sensors are eddy current type sensors.

16. The bicycle rear hub according to claim 10, wherein the sensors are electrostatic capacity type sensors.

17. The bicycle rear hub according to claim 16, wherein each of the electrostatic capacity type sensors has a condenser sensor.

18. The bicycle rear hub according to claim 10, wherein the sensors are optical type sensors.

19. The bicycle rear hub according to claim 10, wherein the sensors have a coil.

20. The bicycle rear hub according to claim 10, wherein the sensors are connected in series.

21. The bicycle rear hub according to claim 10, wherein the sensors are connected in parallel.

22. The bicycle rear hub according to claim 1, further comprising
a wireless transmission section which transmits information based on the output of the sensor to an external section in a wireless manner.

23. The bicycle rear hub according to claim 1, further comprising
a power source which supplies power to the sensor.

24. The bicycle rear hub according to claim 23, wherein the power source is a battery.

25. The bicycle rear hub according to claim 23, wherein the power source is a power generator.

26. A bicycle rear hub comprising:
a hub spindle;
a drive part rotatably supported on the hub spindle, the drive part having a coupling member, and the drive part being configured to receive a driving-force-input member,
the coupling member being coupled to the hub shell, and provided to be separate to the first opposed part;
a hub shell rotatably supported on the hub spindle and operatively coupled to the drive part for rotation by the drive part on the hub spindle;
at least one first opposed part coupled to the drive part;
at least one second opposed part coupled to the hub shell and being disposed oppose to the first opposed part with a gap therebetween; and
a driving force measuring part including at least one sensor arranged to measure at least one of the gap between the first and second opposed parts and a displacement of the gap
the coupling member being formed in a ring shape and a plurality of through holes which extend in a hub spindle direction are formed.

* * * * *